Nov. 13, 1945. D. J. DESCHAMPS 2,388,681
MIXTURE CONTROL APPARATUS
Filed March 13, 1943 15 Sheets-Sheet 1
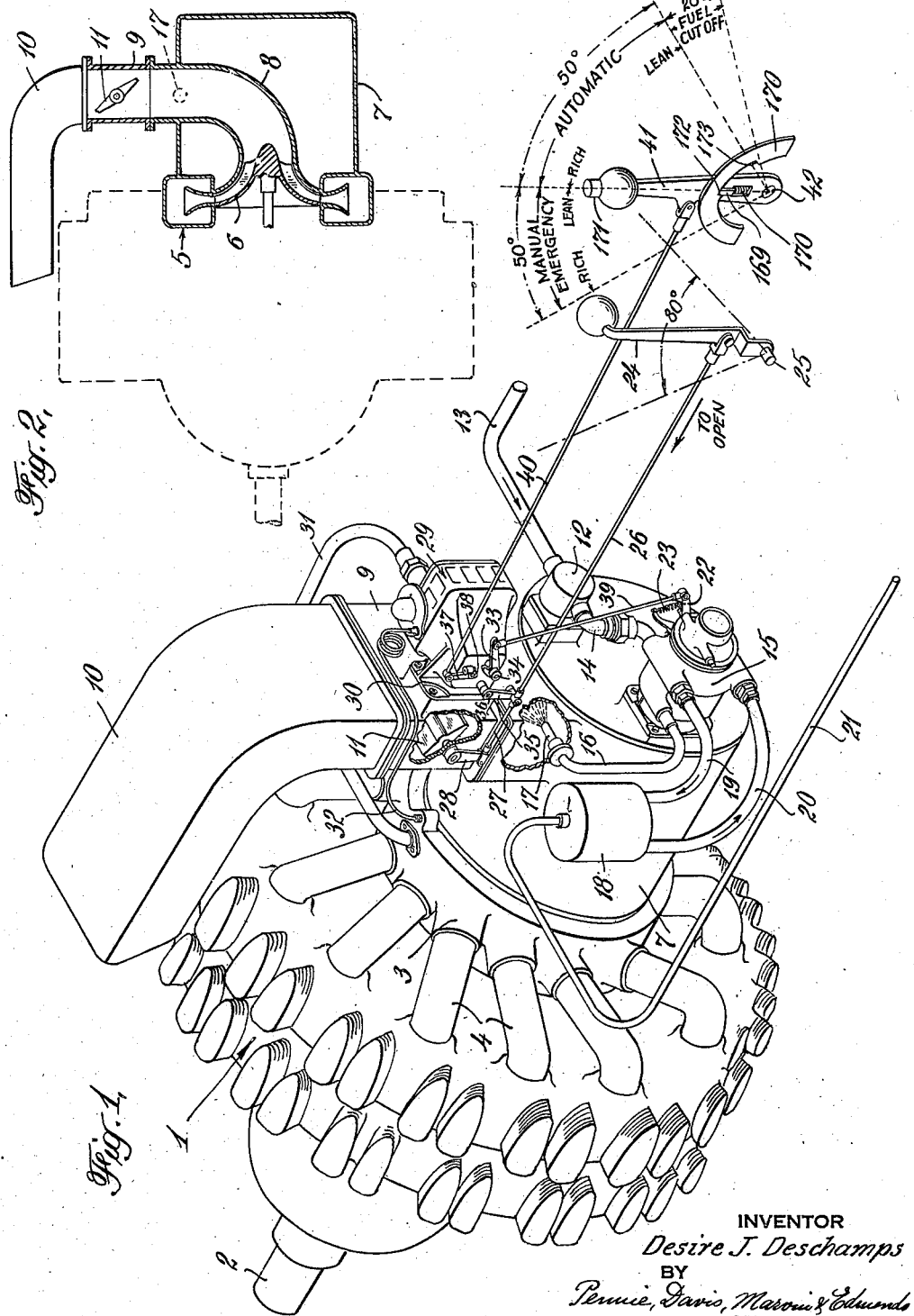
INVENTOR
Desire J. Deschamps
BY
Pennie, Davis, Marvin & Edmonds
ATTORNEYS

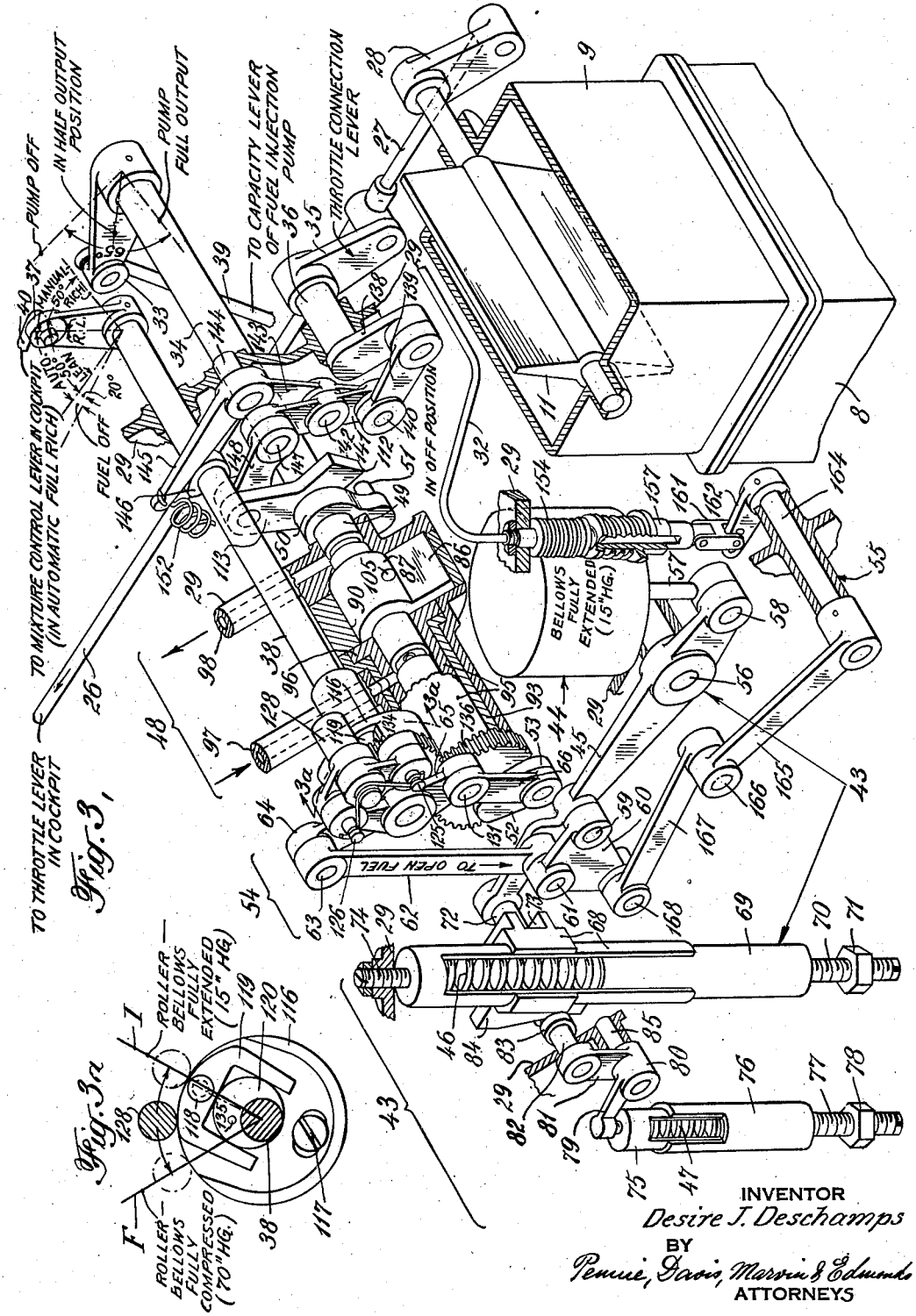

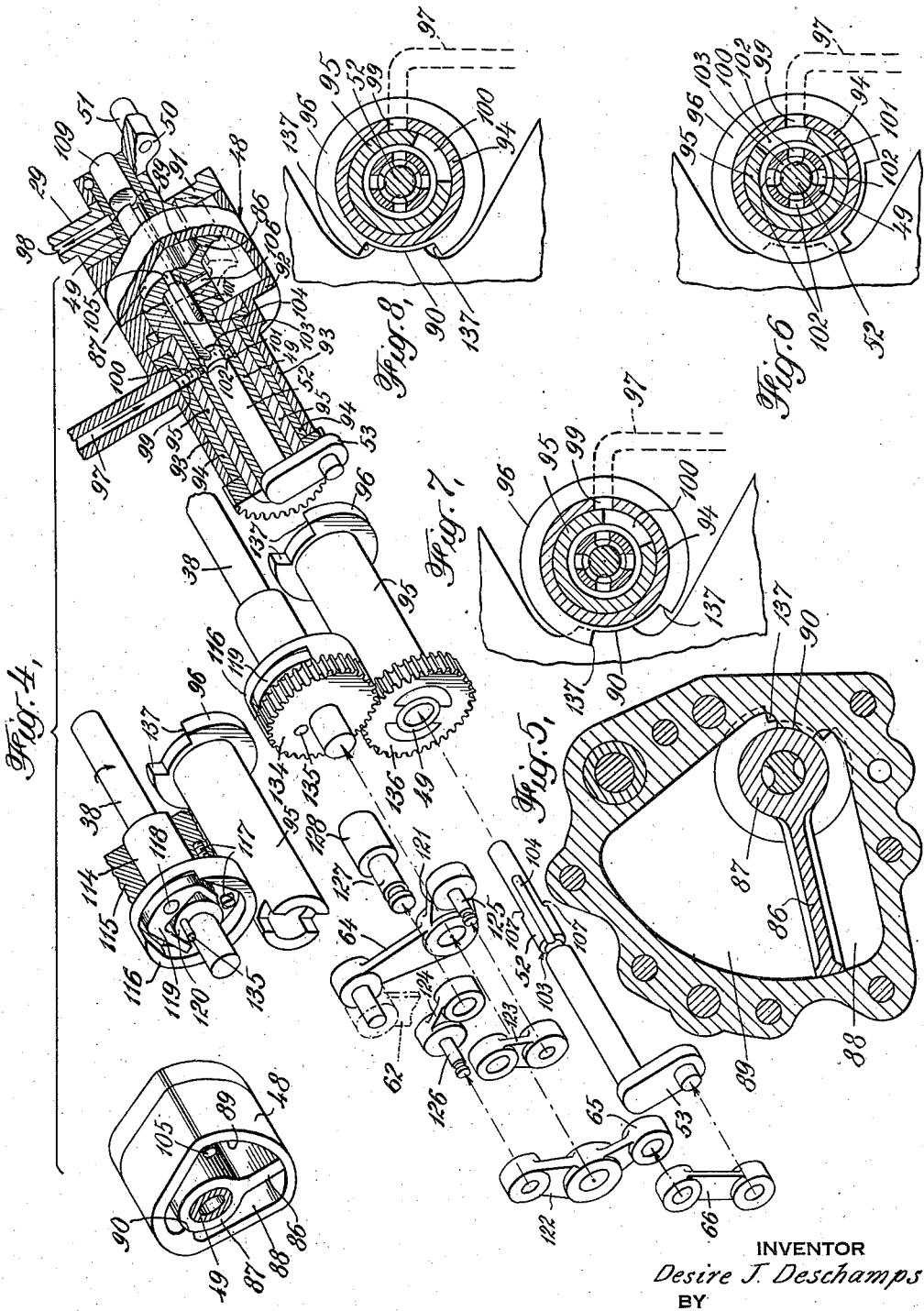

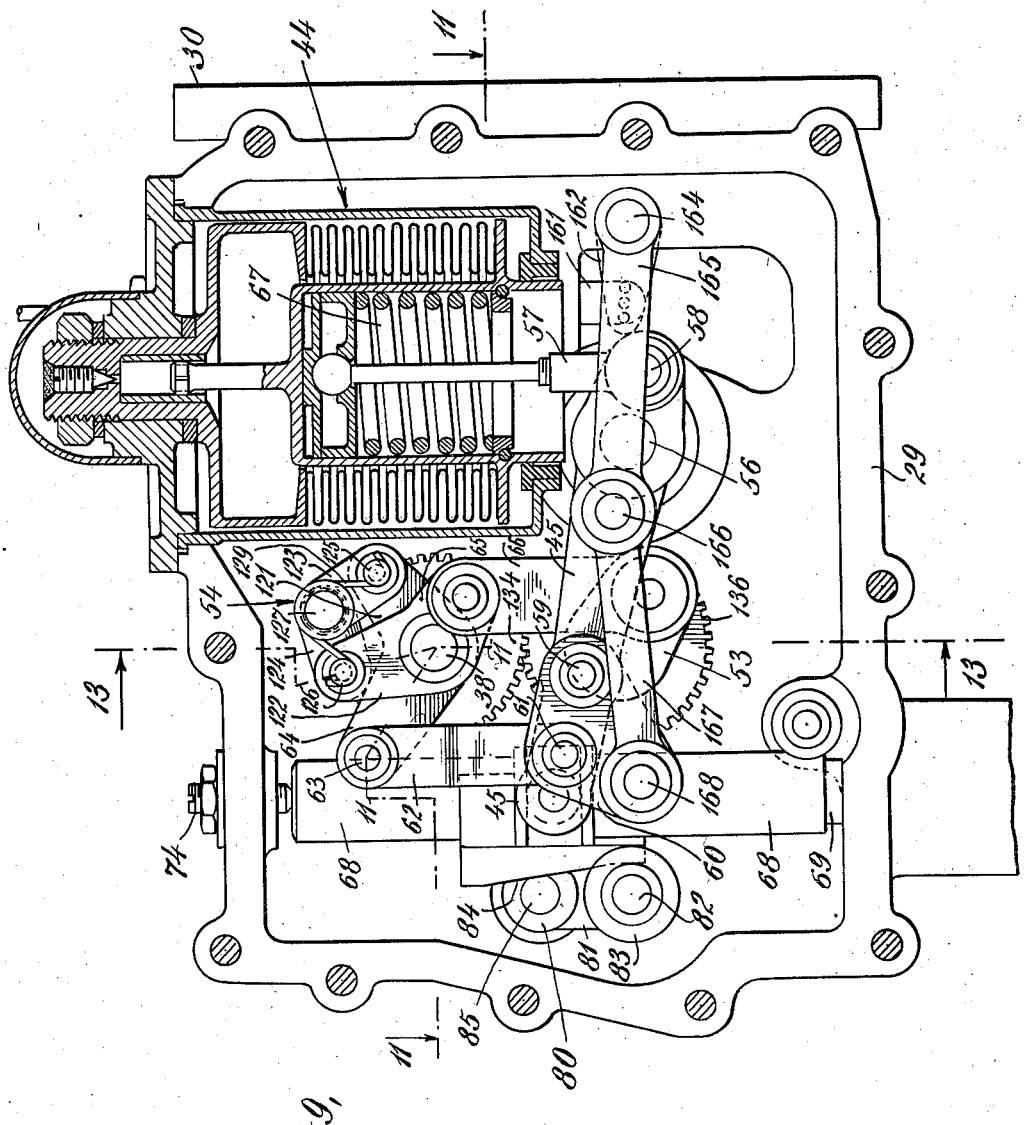

Nov. 13, 1945.    D. J. DESCHAMPS    2,388,681
MIXTURE CONTROL APPARATUS
Filed March 13, 1943    15 Sheets-Sheet 7

INVENTOR
Desire J. Deschamps
BY
Pennie, Davis, Marvin & Edmonds
ATTORNEYS

Nov. 13, 1945.　　D. J. DESCHAMPS　　2,388,681
MIXTURE CONTROL APPARATUS
Filed March 13, 1943　　15 Sheets-Sheet 9

INVENTOR
Desire J. Deschamps
BY
Pennie, Davis, Marvin & Edmonds
ATTORNEYS

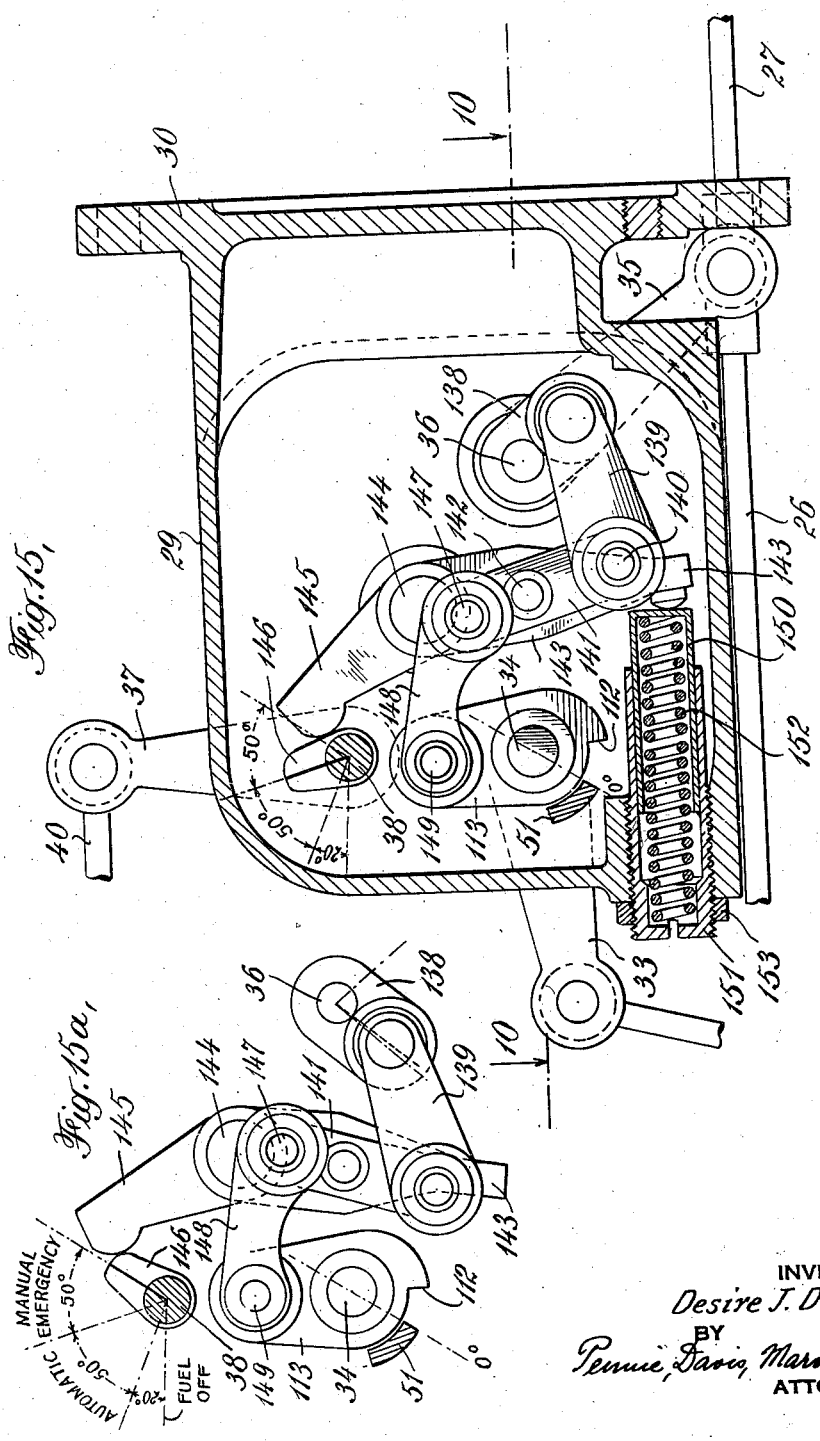

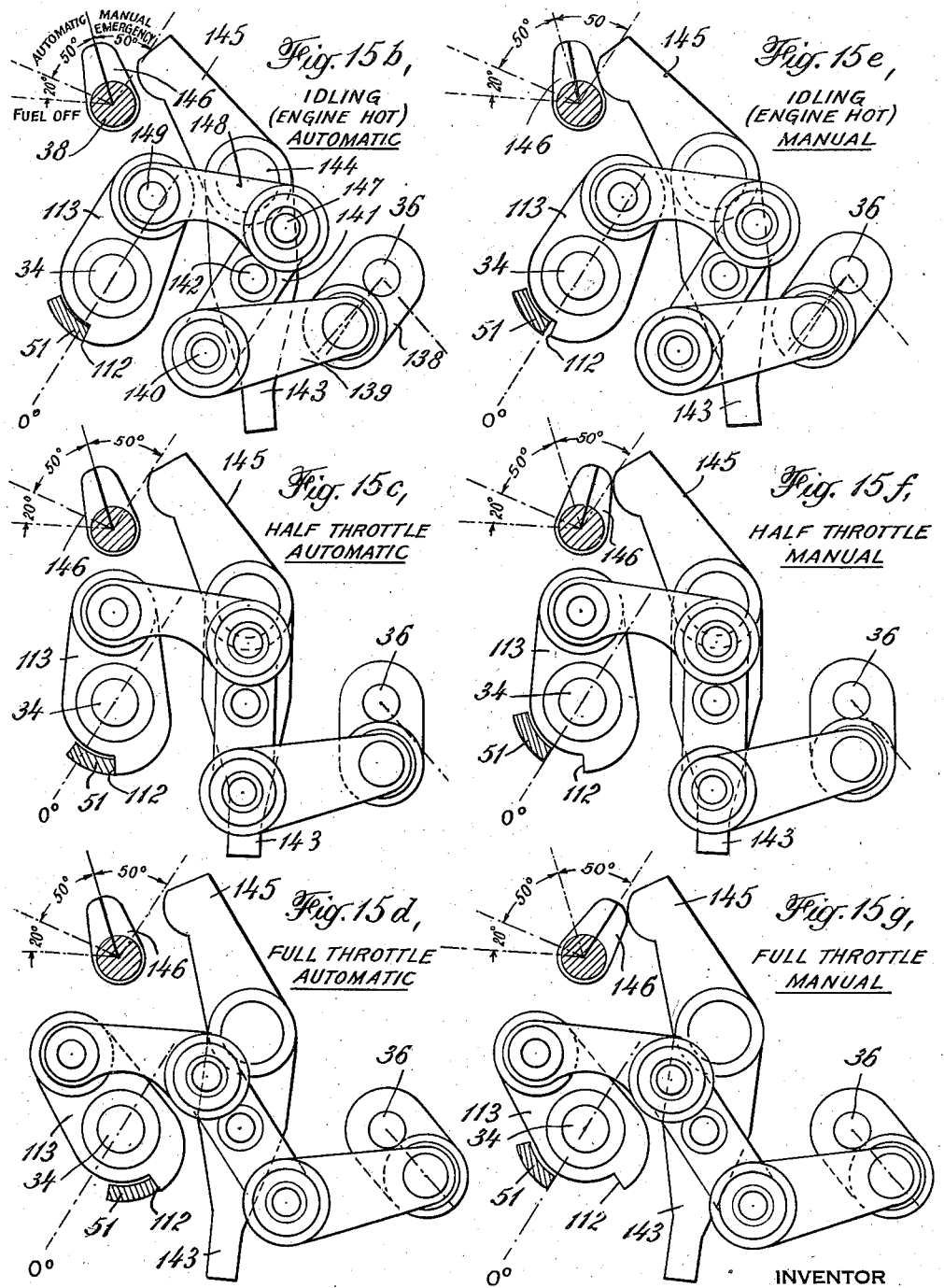

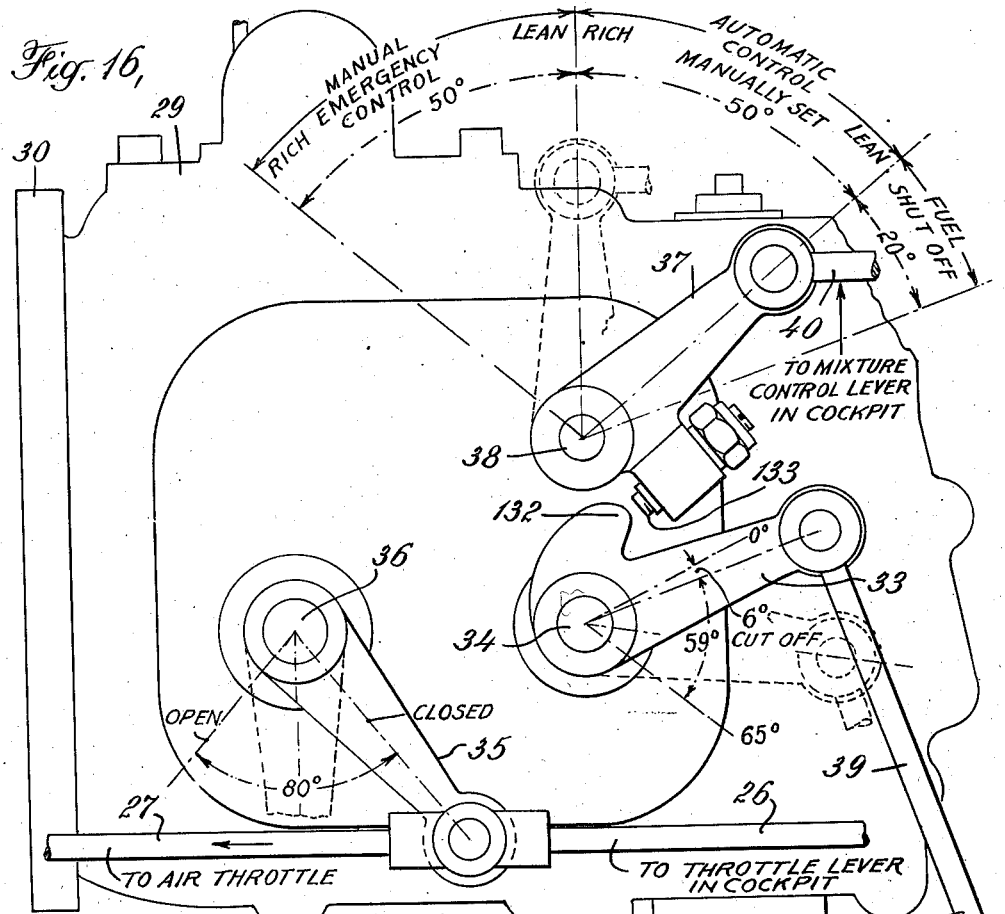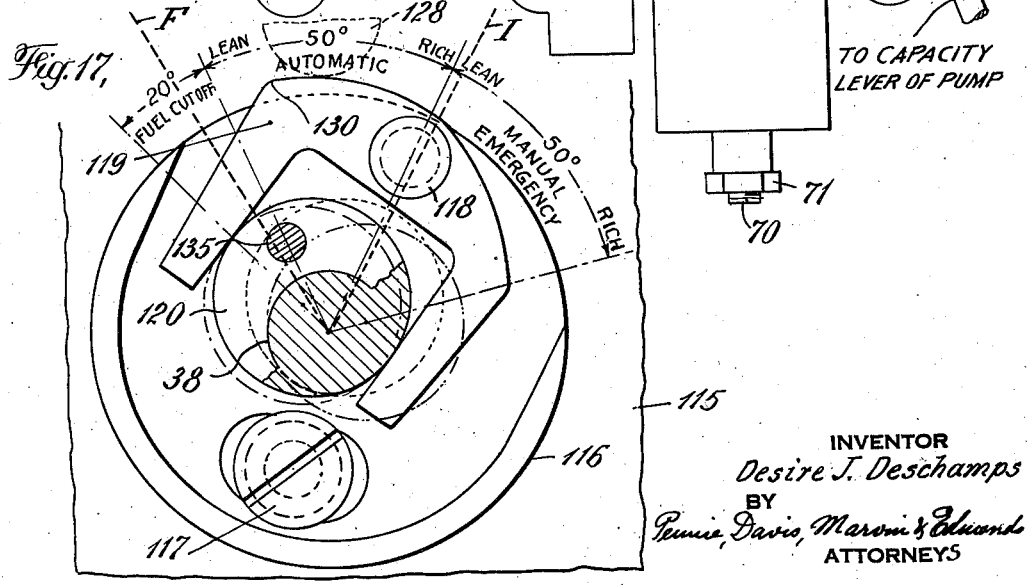

Nov. 13, 1945.   D. J. DESCHAMPS   2,388,681
MIXTURE CONTROL APPARATUS
Filed March 13, 1943   15 Sheets-Sheet 13
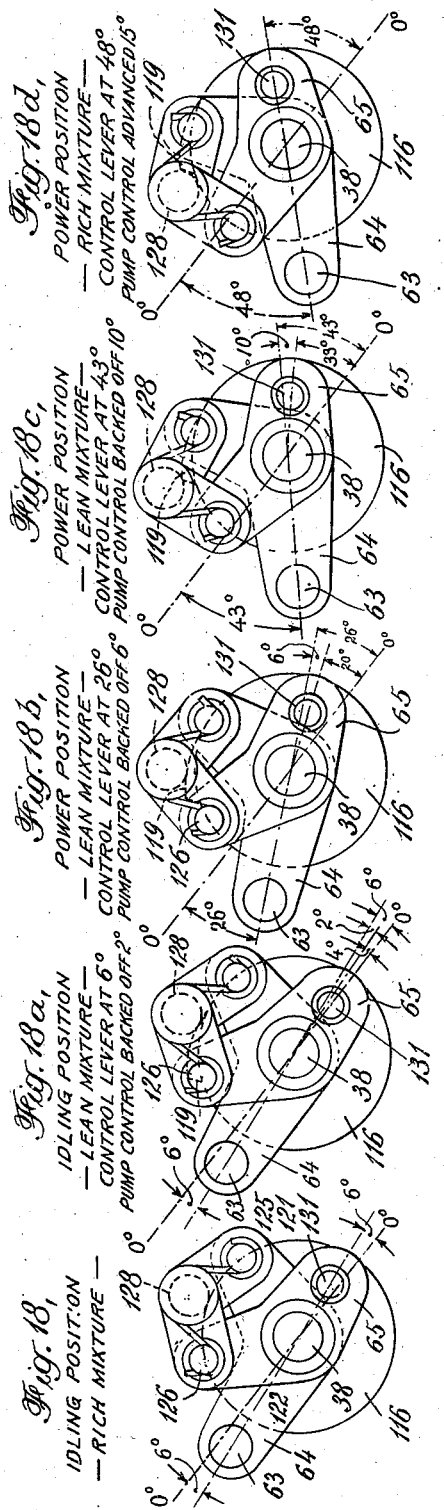
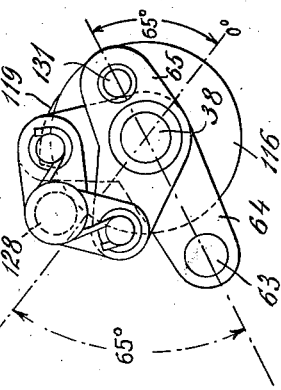
INVENTOR
Desire J. Deschamps
BY
Pennie, Davis, Marvin & Edmonds
ATTORNEYS

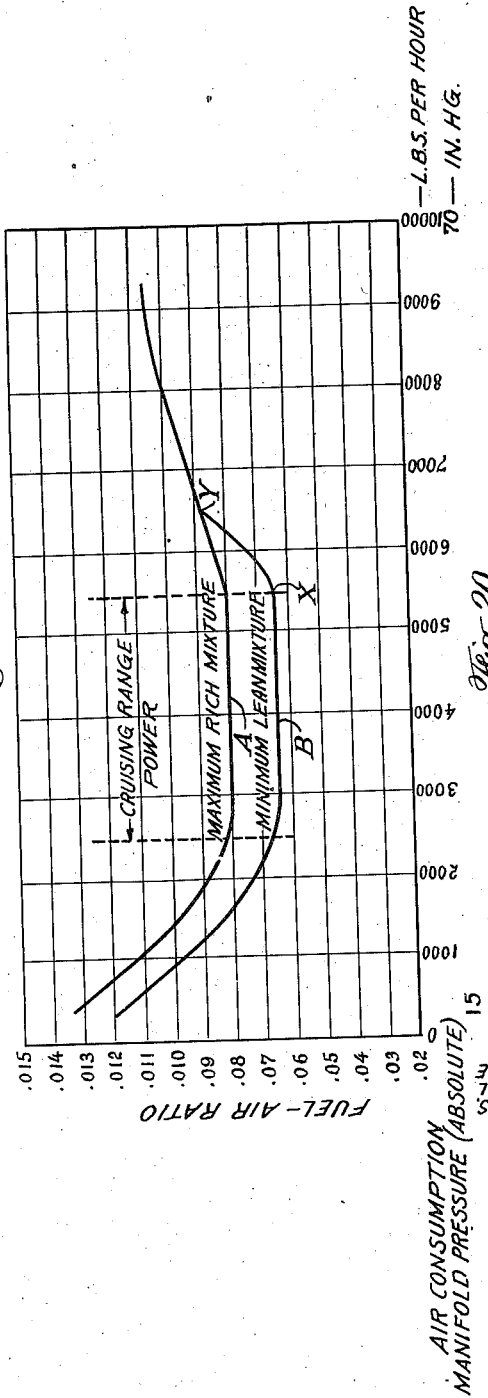
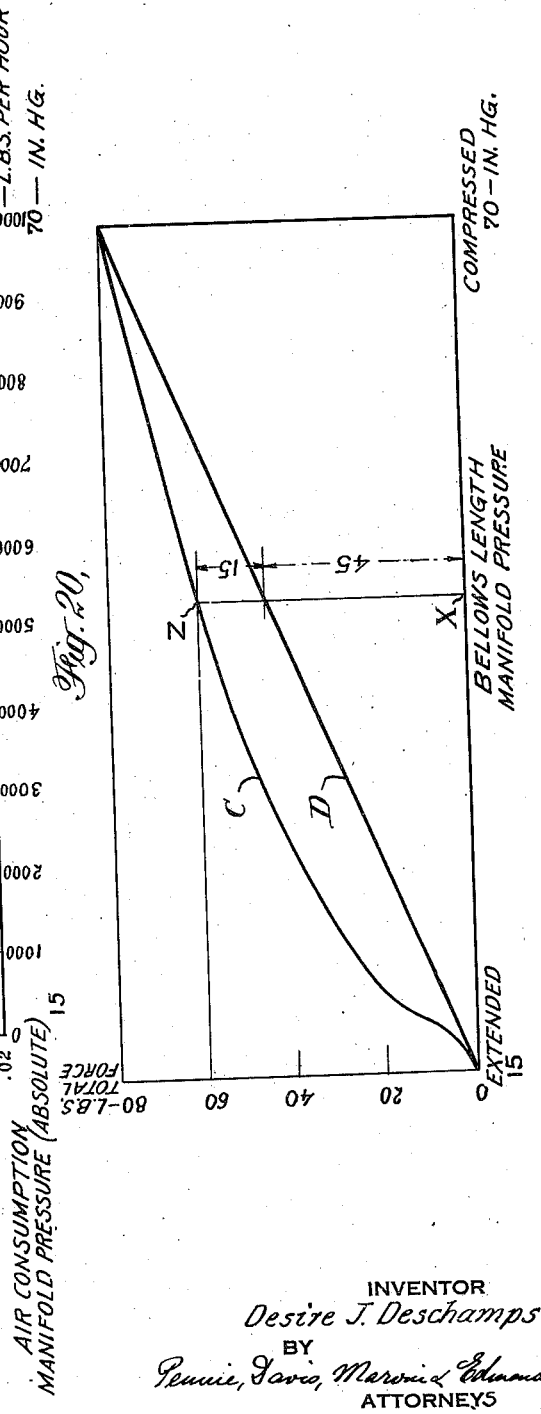

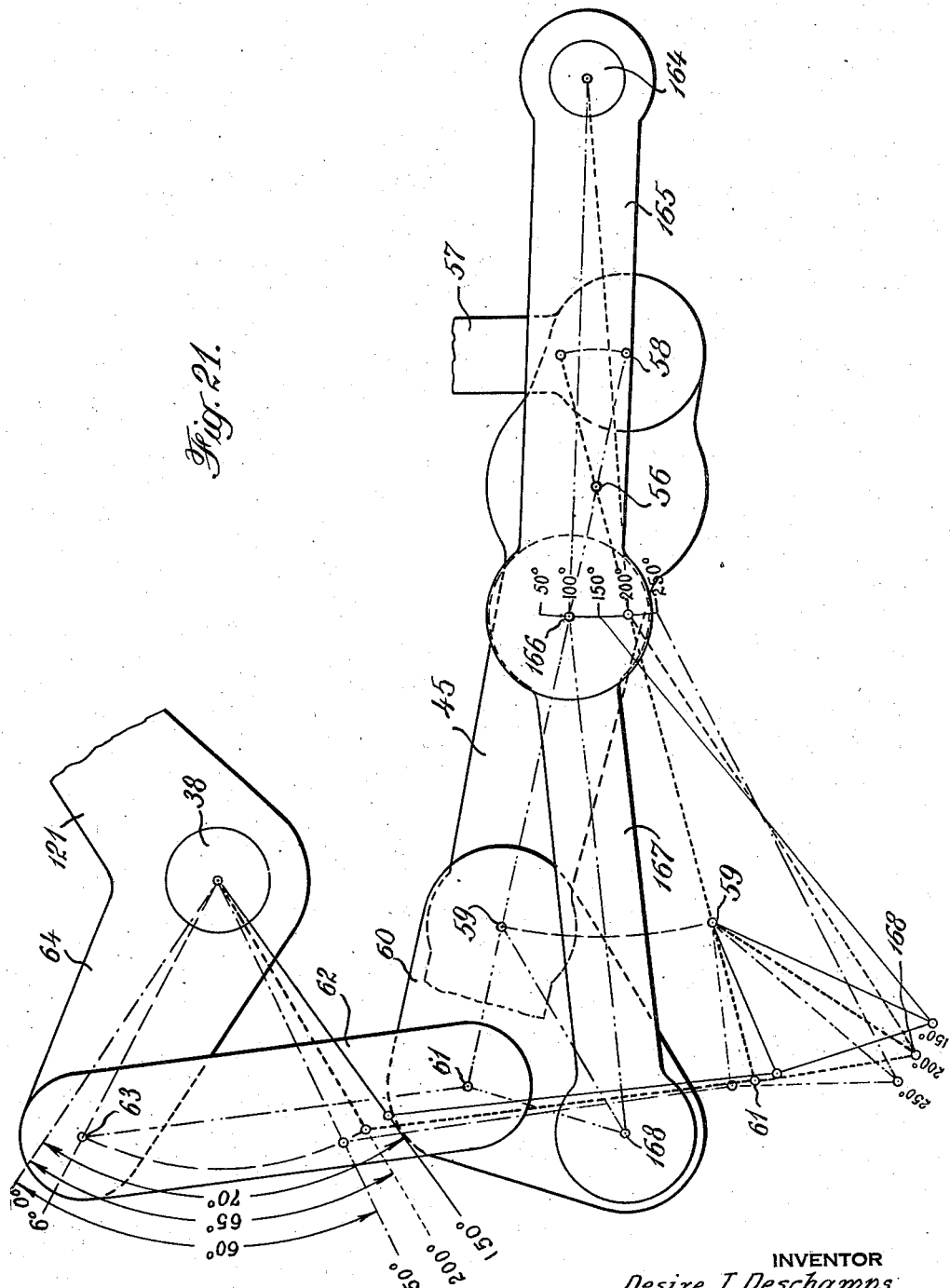

Patented Nov. 13, 1945

2,388,681

UNITED STATES PATENT OFFICE 2,388,681

MIXTURE CONTROL APPARATUS

Desire J. Deschamps, Rutherford, N. J., assignor to Deschamps Fuel Injection Corporation, New York, N. Y., a corporation of New York Application March 13, 1943, Serial No. 479,044

47 Claims. (Cl. 123—119)

This invention relates to fuel mixture control apparatus for internal combustion engines which operate on the Otto cycle, the object of the invention being to provide a generally improved mixture control mechanism for such engines.

The function of mixture control apparatus is to provide an automatic control of the supply, or feed, of the liquid fuel in relation to the air charge to produce a suitable ratio of fuel and air for the proper operation of the engine. The apparatus of the present invention is intended for use in connection with engines of the type in which the fuel mixture is formed in the air intake conduit of the engine externally of the engine cylinders, by the injection into such conduit of liquid fuel under appropriate pressure, and, also for use with engines of the type in which the fuel is injected directly into the engine cylinders.

The invention relates more particularly to fuel mixture control apparatus in which the fuel is supplied by a variable capacity pump driven by the engine, the output of which, at any given setting of its capacity control lever, therefore, increases or decreases substantially in proportion to increase or decrease of the engine speed, and in which the pump capacity control lever is adjusted or controlled in response to the variations in the fluid pressure and temperature in the intake conduit between the air throttle and the engine cylinders. Variations in such fluid pressure occur as the engine is operated under varying conditions of speed and power, and such temperature variations occur as the engine is operated under different conditions of atmospheric temperature.

It has heretofore been recognized that the fuel-air ratio at both the lower and upper ends of the speed and power range of the engine should be higher than throughout the intermediate speed and power range. In fact such a fuel-air mixture characteristic is obtained, in a degree at least, even with certain types of suction "carburetors."

However, the arrangements heretofore proposed in connection with fuel injection engines for providing automatic change of the fuel-air ratio with increase or decrease of engine speed and power (corresponding to different positions of the engine throttle and different manifold pressures) have been inadequate, and the present invention aims, among other objectives, to overcome this deficiency. In every internal combustion engine, or type of internal combustion engine, the pressure in the air induction pipe varies with change in speed and power in a manner or fashion which is characteristic of that particular engine, or type of engine, and these changes in pressure and speed may be shown on a graph or curve expressing precisely the pattern which the change in fuel-air ratio should follow from the engine idling speed, through cruising speed and power and to maximum speed and power. The present invention aims to provide a mixture control apparatus which automatically will control the mixture to provide the correct fuel and air ratio throughout the entire speed and power range of the engine in accordance with such characteristic pattern of the particular engine, or type of engine, so that at all speeds the engine will be supplied with fuel and air in correct proportions merely by manipulation of the air throttle lever. This is of considerable importance to a combat aircraft pilot as it eliminates the necessity of his operating a second lever in order to obtain full power from the engine.

However, in the operation of modern aircraft engines it has been found desirable to enable the pilot to alter or adjust the fuel-air ratio for the purpose of obtaining lean mixtures under certain operating conditions of the aircraft for the purpose of conserving fuel. The present invention also aims to make it possible for the pilot to change the setting of the automatic mixture control mechanism to cause this mechanism to maintain a leaner or a richer mixture pattern at the pilot's discretion. Such change in setting does not alter the mixture by the same amount at all throttle settings, which would mean a different percentage change at every throttle setting and, consequently require frequent manipulation of the ratio adjusting lever by the pilot, but the object of the present invention is to provide that when the pilot changes the setting, this change shall be effected as a percentage change throughout a desired portion of the power range of the engine. In other words, the object is to enable the pilot to change the setting of the automatic fuel-air ratio mechanism by a selected or predetermined percentage or proportion.

Should a combat aircraft be operating with the automatic mixture control manually set as just described, to provide a lean mixture, and, suddenly, under attack or otherwise, require full engine power, so that the pilot suddenly opens the throttle to full open position, or to any position corresponding to an engine power above the cruising range, it is not only desirable but necessary for the engine to return to operation on a full or maximum rich mixture pattern. Accordingly it is an object of the present invention to provide for this contingency without attention from the pilot, other than the moving of the throttle to full open position. That is to say, the present automatic mixture control aims to operate the engine on the full rich mixture characteristic pattern or curve of the engine whenever the engine is operated at a speed and power greater than any predetermined amount, usually the power corresponding to maximum cruising power.

Another aim of the invention is to enable the pilot to change the setting of the automatic mixture control mechanism (to vary the fuel-air ratio pattern) progressively, or, that is to say, by infinitely small increments, making the change in pattern continuously variable, so that he can obtain an exact adjustment to meet any operating condition.

Another object of the invention is to enable the pilot, merely by a sudden opening of the throttle, momentarily to increase the fuel-air ratio to cause the engine to accelerate quickly, the automatic fuel-air ratio control mechanism immediately, however, assuming control of the mixture.

Another object of the invention is to provide for the adjusting of the fuel-air ratio at idling speed of the engine without affecting the mixture ratio at other speeds.

Another object of the invention is to provide for the adjusting of the fuel-air ratio at idling speed without interfering with the ability to cut off the fuel completely upon the stopping of the engine.

In case of failure of the automatic mixture control mechanism properly to control the mixture, from any cause, it is desirable for the pilot to control the mixture manually. Accordingly another object of the present invention is to enable the pilot (preferably by manipulation of the same lever which changes the setting of the automatic control mechanism to different patterns) to adjust the fuel-air ratio by hand, should the automatic mixture control mechanism fail to operate.

A further object of the invention is to provide automatic fuel-air ratio control mechanism and, in addition, a manually operated fuel-air ratio control mechanism inter-related to one another in such a way that both mechanisms can be operated by a single lever at the pilot's position.

A still further object of the present invention is to provide a fuel-air ratio controlling mechanism which will compensate for changes in temperature as nearly as possible in proportion to the extent of the temperature change.

The invention will be understood from a study of the accompanying drawings which show, by way of example, an embodiment of the invention as used in connection with an aircraft engine installation of the spark ignition type and in which the fuel is injected under suitable pressure into the air induction conduit between the air throttle and the engine (non-timed injection). Also this engine is provided with a supercharging blower which raises the pressure of the fuel and air mixture above that of atmospheric pressure except when the engine is idling or developing very low power. It is to be understood, however, that the improved mixture control apparatus may also be used with engines not provided with superchargers and where the air is introduced into the cylinders entirely by suction. It will be understood also that the invention is capable of mechanical expression in other forms than the embodiment illustrated and, consequently, that the invention is not limited to this embodiment but that its scope is indicated in the appended claims.

Referring now to the accompanying drawings:

Fig. 1 is a perspective view, partially diagrammatic, of a radial aircraft engine provided with the improved automatic mixture control apparatus of the invention;

Fig. 2 is a diagrammatic central vertical longitudinal section through the air intake conduit and supercharger;

Fig. 3 is a diagrammatic perspective view with certain parts in section showing the general arrangement and operation of the automatic mixture control mechanism, the positions of certain parts not agreeing with the other figures;

Fig. 3a is a vertical section taken on the line 3a—3a of Fig. 3, the parts being set to provide automatic full rich operation;

Fig. 4 is an "exploded" perspective view to be used in connection with Fig. 3 and showing certain of the parts of Fig. 3 separated from one another to facilitate an understanding of their arrangement and operation;

Fig. 5 is a vertical section taken on line 5—5 of Fig. 10 and shows a detail of a vane type servomotor forming a part of the control mechanism;

Figs. 6, 7 and 8 show other details and are diagrammatic vertical sections showing the connections for pressure liquid to the servomotor pilot valve;

Fig. 9 is a vertical sectional view of the improved mixture control apparatus taken on the broken line 9—9 of Fig. 10 and illustrating the pressure responsive bellows diaphragm and parts actuated thereby;

Fig. 15 is a vertical section taken on broken line 15—15 of Fig. 11 looking in the direction of the arrows and showing the lever and linkage mechanism interconnecting the automatic mixture control mechanism, the air throttle and the hand setting lever, the parts being shown in one position for starting the engine;

Fig. 15a is a diagrammatic view of the lever and linkage mechanism of Fig. 15 with the parts in a different position for starting the engine;

Figs. 15b, 15c and 15d are views similar to Fig. 15a with the parts in positions corresponding to three engine operating conditions under the control of the automatic fuel-air ratio mechanism;

Figs. 15e, 15f and 15g are similar views showing the parts in positions corresponding to the same three engine operating conditions but under manual (emergency) control of the fuel-air ratio;

Fig. 16 is a view of the lever end of the control mechanism casing to illustrate the manner of shutting off the fuel supply after the engine has been stopped;

Fig. 17 is a vertical section similar to Fig. 3a but drawn to a larger scale and showing the parts set in the position to provide automatic full lean operation;

Figs. 18, 18a, 18b, 18c, 18d and 18e show the automatic mixture leaning out mechanism in different positions corresponding to idling adjustment and different engine load conditions;

Fig. 19 is a diagram showing, for a particular engine, the variation of the full rich fuel-air ratio with change in absolute pressure within the engine manifold from idling speed and power to full engine speed and power and also showing the minimum lean fuel-air ratio curve produced by the leaning out mechanism;

Fig. 20 is a force-displacement diagram of the bellows diaphragm, corresponding to the fuel-air ratio characteristic shown in Fig. 19; and Fig. 21 is a diagrammatic view of the temperature compensating mechanism drawn to an enlarged scale to illustrate the manner of its operation.

Figure 10:
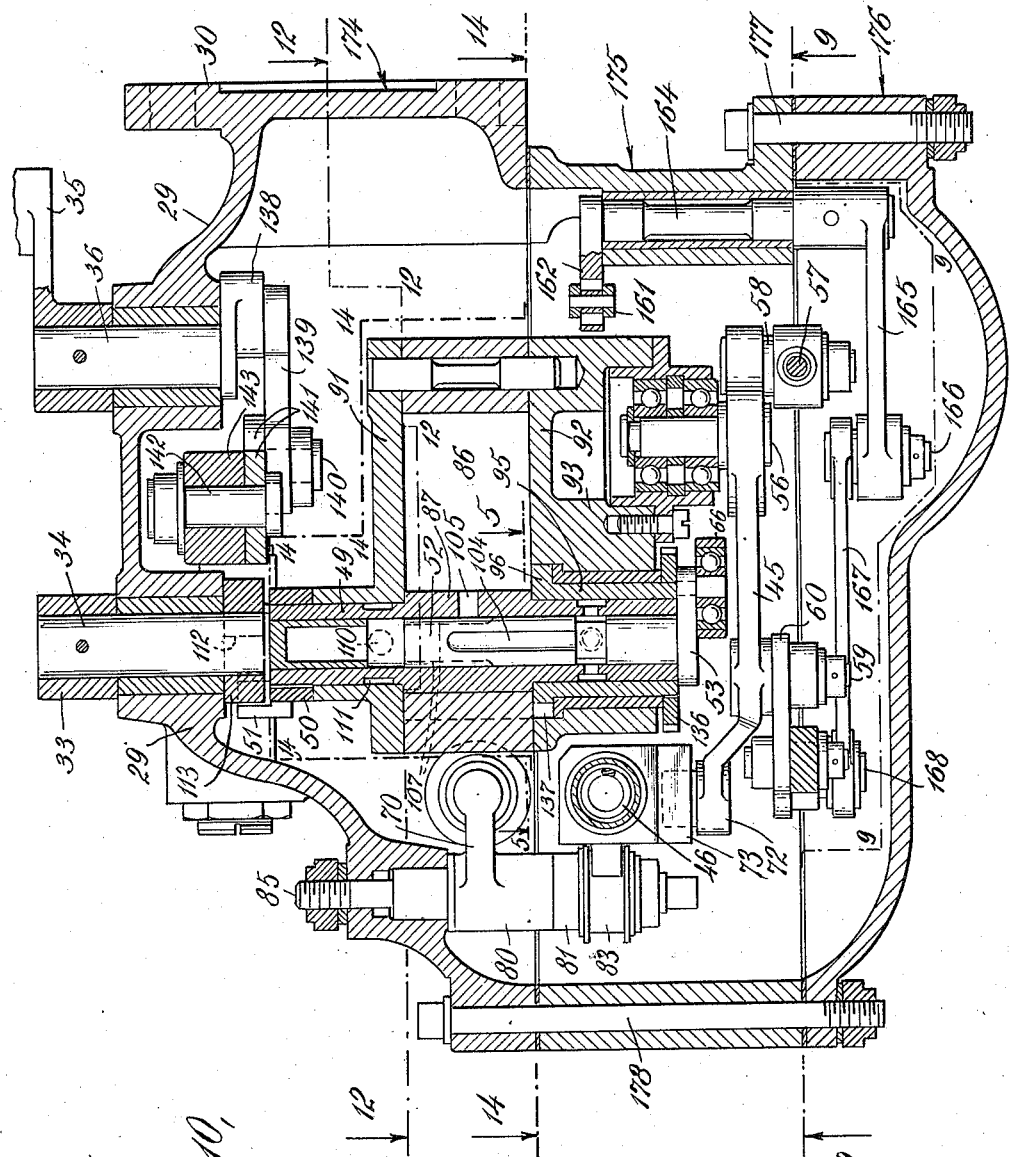
Fig. 10 is a horizontal section taken on the plane indicated by lines 10—10 of Figs. 13 and 15, passing through the hollow servomotor shaft and concentric pilot or control valve.

Referring now to the accompanying drawings, there is shown diagrammatically in Fig. 1 a radial aircraft engine 1 having a shaft 2 to receive the propeller and, at its rear end, a circular housing 3, the interior of which comprises a manifold from which radiate pipes 4 to the various cylinders of the engine. Within housing 3 there is also a rotary supercharger 5 having an impeller 6 driven from the engine and delivering the fuel and air mixture to the manifold. Within a casing 7 at the rear of manifold housing 3 there is a conduit 8 leading from the throttle body 9 to convey the air and fuel mixture to the impeller 6. The induction pipe system is completed with an L-shaped air scoop or intake 10 which has an opening facing toward the front of the engine and conveys the air to the throttle body 9 within which is suitably pivoted an air throttle 11.

Mounted at the rear of casing 7, or in any other convenient position, there is located a fuel transfer pump 12 which moves the fuel from the tanks through fuel line 13 to the engine. The fuel from pump 12, through pipe 14, enters a variable capacity injection pump 15, driven by the engine, which is adapted to deliver the fuel under suitable pressure (usually several hundred pounds) through pipe 16 to the spray nozzle 17 by means of which the fuel is injected into conduit 8 between air throttle 11 and the impeller 6. It will be understood that nozzle 17 may be arranged in any desired manner to obtain intimate mixture of the fuel particles and air, as, for example by directing the spray directly at the center of the impeller.

With injection pump 15 there is usually associated a vapor eliminator 18 which may receive the fuel from pump 15 through pipe 19 and return it to the pump through pipe 20. A vapor line 21 returns vapor separated from the fuel in eliminator 18 to the fuel tank.

Injection pump 15 is provided with a capacity control lever 22 by means of which the pump output to nozzle 17 at any given pump speed can be regulated from zero to maximum. Lever 22 is biased toward the zero output or shut-off position by means of a helical spring 23 which, for clarity, is shown on the outside of the pump but which in practice is concealed within the pump casing.

The air throttle 11 is controlled by means of a throttle lever 24 pivoted at 25 in the cockpit of the aircraft and connected with throttle valve 11 by means of link rods 26 and 27, link 27 being connected to the lower end of actuating arm 28 which is fixed on one end of the pivot shaft of throttle valve member 11.

The capacity control lever 22 of pump 15 is actuated to control the pump output, to produce the correct ratio of fuel and air, by means of the automatic mixture control apparatus contained in a housing indicated generally by numeral 29. This housing is provided with a suitable supporting flange 30 by means of which it may be bolted to a boss projecting from the front of throttle housing 3 or other suitable support.

Housing 29 contains mechanism which is responsive to variations in pressure and temperature within the engine manifold 3 and for this reason the housing is sealed and its interior is placed in communication with manifold 3 by means of a duct 31. It will be understood that the connection of duct 31 with manifold 3 shown in Figs. 1 and 2 is diagrammatic in character, as this connection may be made at any point, or plurality of points, of the manifold to cause the pressure within housing 29 to vary as nearly as possible in accordance with the average pressure within the manifold.

Temperature variations within manifold 3 are registered by a temperature responsive element or elements (not shown) of the liquid expansion type suitably positioned with respect to the manifold to respond to changes in the temperature of the air or fuel-air mixture delivered to the engine by the supercharger. Such temperature responsive element, or elements, are connected with the interior of casing 29 by means of a capillary tube 32. The mechanism within casing 29 by means of which such pressure and temperature variations are employed to effect the shifting of the pump capacity lever 22 to control the fuel air ratio are to be described in detail below.

This mechanism has three external levers, namely, pump control lever 33, pinned on shaft 34, throttle connection lever 35, pinned on shaft 36, and a setting lever 37 for the mixture control mechanism which is pinned on shaft 38. Pump control lever 33 is connected to pump capacity lever 22 by means of a link rod 39. Link rod 26 from throttle handle 24 and link 27 from throttle valve 11 are both connected to throttle control lever 35 so that this lever is actuated simultaneously with any opening or closing movement of the air throttle. Setting lever 37 is connected by means of a link rod 40 to a mixture control lever 41 pivoted at 42 in the cockpit of the aircraft. Throttle lever 24 and mixture control lever 40 prefreably are placed in proximity to one another so that the pilot can manipulate them with one hand.

The connection of fluid pressure tube 31 to the output side of the supercharger renders the mixture control mechanism more sensitive in its operation than if tube 31 were connected to conduit 8 on the intake side of the supercharger. Nevertheless it will be understood that the pressure variations on either side of the supercharger may be used to operate the automatic mixture control mechanism. The mixture control mechanism within housing 29 is illustrated diagrammatically in the perspective views (Figs. 3 and 4) and comprises the following principal elements:

A. A fluid pressure responsive mechanism indicated generally by numeral 43 (Fig. 3) and comprising a bellows diaphragm 44 (Figs. 3, 9 and 11), a main actuating lever 45, the operating springs 46 and 47 and the connected parts.

B. A vane type servomotor indicated generally by numeral 48 having a hollow operating shaft 49 to which a driving member 50 having a driving lug 51 which engages a part secured to shaft 34 of pump control lever 33, to turn the same. Within hollow shaft 49 there is a rocking type pilot or control valve 52 for the servomotor provided with an operating crank 53 at its left hand end.

C. A connecting and automatic leaning out mechanism indicated generally by numeral 54 through the instrumentality of which the fluid pressure responsive mechanism 43 actuates the pilot valve 52 of servomotor 48.

D. Fuel-air ratio control for quick acceleration, and for starting the engine which comprises the floating fulcrum lever and linkage mechanism shown at the right hand portion of Fig. 3 and in Fig. 15.

E. A manual emergency mixture control mechanism comprising the floating fulcrum lever and linkage mechanism just referred to and certain additional parts cooperating therewith.

F. A temperature compensating mechanism indicated generally by reference numeral 55 which cooperates with the pressure responsive mechanism 43 in actuating the connecting and leaning out mechanism 54 and, through this, the servomotor pilot valve 52.

*The fluid pressure responsive mechanism*

Actuating lever 45 is the main operating lever of this mechanism and is fulcrumed in an interior part of housing 29 for rocking movement about a center 56. Lever 45 is actuated by bellows diaphragm 44 through a connecting rod 57 hinged at 58 to the short arm of lever 45 extending from the right of fulcrum 56 (Figs. 3, 9 and 10). The upper end of rod 57 is connected to the bellows by a ball type universal joint, of which the lower socket member is held in engagement with the ball by means of a heavy spring 67.

On the longer left hand portion of lever 45 there is pivoted at 59 a triangular lever 60, and hinged to this lever at 61 is the main actuating link 62 for the control mechanism, which is hinged at its upper end at 63 to operating lever 64 of the connecting and leaning out mechanism 54. This mechanism, which will be described in detail later, has a pilot valve-actuating lever 65 which is connected by a link 66 to operating crank 53 of servomotor pilot valve 52. Downward motion of operation lever 64 causes upward motion of valve-actuating lever 65 and the rocking of pilot valve 52 in a direction to cause servomotor shaft 49 to turn in a direction to increase the output of fuel pump 15.

The temperature-compensating mechanism 53 exerts its influence on the movement of operating link 62 through triangular lever 60, but, until later on in this specification, we will consider that lever 60 is temporarily fixed with respect to actuating lever 45 thereby making the motion of lever 62 the same as though it were hinged directly to lever 45.

In the engine under consideration the manifold pressure varies from a minimum of about 15" Hg absolute to a maximum of about 70" Hg, it being understood that this range of pressure may vary in accordance with the particular engine on which the mixture control apparatus is to be installed. Bellows 44 is arranged to operate under compression only and consequently is sealed at a pressure of about 12" Hg, that is, from 2" to 3" Hg below that corresponding to the lower end of the manifold pressure range. In Figs. 3 and 9 of the drawings bellows 44 is shown in its fully extended condition, that is, corresponding to a pressure of 15" Hg. Hence as the manifold pressure increases the bellows 44 is compressed to a greater and greater extent thereby raising the right hand end of lever 45 and lowering its left hand end.

The fluid pressure acting on bellows 44 is balanced by means of a main operating spring 46 and an auxiliary operating spring 47. Spring 46 is mounted within a tubular housing 68 having a plunger 69 telescoped into its lower end, the upper end of this plunger forming a fixed abutment for the lower end of spring 46. In order to adjust the pressure of spring 46 an adjusting screw 70 engages the lower end of plunger 69 and is accessible from the exterior of housing 29 (Fig. 10) and provided with a lock nut 71.

The force of spring 46 is transmitted to the left hand end of actuating lever 45 through casing 68, and a roller 72 which turns on a transverse pin mounted at the left end of lever 45. Roller 72 slides in a horizontal guide way 73 provided on the side of the casing 68. The upward movement of casing 68 is limited by an adjustable stop screw 74, also accessible from the exterior of casing 29, which constitutes a means for adjusting the mixture ratio at the idling speed of the engine, as will appear later on.

Referring now to Fig. 19, curve A shows the characteristic fuel-air ratio pattern for maximum or full rich mixture operation of the particular engine upon which the control shown in the drawings is to be used. That is to say, curve A shows the variation in the full rich fuel-air ratio of the engine throughout its power and speed range as represented by its air consumption in pounds per hour and corresponding variation in manifold pressure in inches of mercury.

The central portion of this characteristic curve or pattern shows that the engine requires a constant fuel-air ratio throughout the greater portion of its cruising range power and speed, but that, at the lower range of power and speed the required fuel-air ratio increases quite steeply and, that at the power and speed range above the cruising range the required fuel-air ratio also increases but not so steeply and not to so great an extent. To control or regulate the capacity control lever 22 of fuel injection pump 15 in such a way as to bring about such a variation in the fuel-air ratio throughout the range of manifold pressure corresponding to the range of speed and power of the engine presents a considerable problem.

The output of pump 15 increases or decreases proportionally with changes in engine speed, so that, for any given, or constant, setting of the engine throttle, the fuel-air ratio is automatically controlled merely by the change in speed of the pump, but the problem is to regulate this ratio so as to make it follow closely the engine characteristic as the throttle is opened or closed to a greater or less extent.

To accomplish this, the force employed to balance the fluid pressure on bellows diaphragm 44 is made to vary with change in manifold pressure in a predetermined manner from the minimum pressure (corresponding to idling speed) to the maximum pressure (corresponding to full throttle opening or full engine power and speed), and in such a way as to cause the proper actuation of operating lever 64 and pilot valve 52 (and consequently pump capacity lever 22) to bring about the change in fuel-air ratio according to the characteristic pattern of the engine, such, for example, as shown in curve A of Fig. 19, it being understood that equal displacements of pilot valve 52 (and lever 22) cause substantially equal changes in the output of fuel pump 15.

In Fig. 20 there is shown at curve C the variation just described in the force required to balance bellows 44 from its fully extended condition corresponding to the minimum manifold pressure to its fully compressed condition corresponding to the maximum manifold pressure. That is to say, the force-displacement curve C corresponds to the engine characteristic curve A, Fig. 19. The shape of curve C therefore depends upon the construction of the particular engine, or type of engine, with which the mixture control is to be used.

The proper variation in balancing force according to curve C of Fig. 20 for balancing the fluid pressure on bellows 44 is obtained by the coaction of springs 46 and 47. In Fig. 20 the balancing force supplied by spring 46 is indicated by curve D. This curve, however, coincides with curve C only at two points, namely, its opposite ends. In other words, the force supplied by spring 46 is correct only at idling speed and at full throttle opening; in between these points a greater and a varying force is required.

This additional force is provided by means of auxiliary spring 47 operating through the mechanism shown particularly in Figs. 3, 9, 12 and 14. Spring 47 is mounted within a casing 75 over the outside of which a lower sleeve 76 is telescoped. The lower end of spring 47 rests on the bottom of sleeve 76 and the position of this sleeve is adjustable vertically by means of an adjusting screw 77 accessible from the exterior of casing 29 and locked by means of a nut 78. Spring 47 tends to urge casing 75 upwardly transmitting its force to an arm 79 secured to a member 80 which has a second arm 81 projecting vertically at substantially right angles to arm 79. Arm 81 at its upper end has a laterally projecting pin 82 carrying a grooved roller 83 which coacts with a cam 84 secured to tubular casing 68 of main spring 46. Member 80 is mounted for rocking movement on a fixed shaft 85 secured in one of the outside walls of housing 29.

By virtue of the mechanism just described including cam 84 and roller 83 a varying force is transmitted to actuating lever 45 of the pressure-responsive mechanism and the shape of cam 84 is so arranged as to cause this force, when added to the force of spring 46, to produce a total force which varies according to curve C of Fig. 20. Taking one point Z on curve C, for example, this corresponds to a force of approximately 60 pounds required to balance the fluid pressure operating on the bellows when compressed by an amount indicated by the length of the line OX. This force is made up of a force of approximately 45 pounds, produced by main spring 46, to which is added a force of approximately 15 pounds which is provided by auxiliary spring 47 acting through roller 83 and cam 84.

Stating it in another way, the resultant force provided by the two springs 46 and 47 opposing the action of the manifold pressure on bellows 44 is modified by the action of cam 84 and roller 83 in such a way as to bring about the control or regulation of pilot valve 52 to produce variations of the fuel-air ratio following the characteristic pattern required by the engine.

From this description it will be understood that the shape of the fuel-air ratio curve can be adjusted within certain limits by changing the compression of springs 46 and 47 by means of adjusting screws 70 and 77; also that if the desired result cannot be obtained in this way, then cam 84 can be replaced with another cam having a different profile. By such adjustments the mechanism can be adapted for operation with any particular engine or type of engine.

*The servomotor*

Servomotor 48 has a vane 86 projecting from one side of a circular hub 87 (Fig. 4) which is keyed or otherwise securely fixed to the hollow operating shaft 49 of the servomotor so that movement of the vane causes movement of driving member 50 and driving lug 51. Vane 86 divides the servomotor chamber into two compartments 88 and 89 which are separated from one another on the rear side of hub 87 by means of a land 90 coacting with the hub.

At the right of the servomotor, as viewed in Figs. 3 and 4, the motor shaft 49 is arranged to turn in a bore through the end wall 91 of the servomotor chamber. The wall 92 at the left of the chamber has a projecting portion 93 considerably larger than shaft 49 through which extends a cylindrical bore also much larger than shaft 49. Fixed in this bore is a bushing 94 and arranged for turning movement within bushing 94 (for a purpose to be described) there is a sleeve member 95 having a flange 96 at its inner end bearing against the servomotor hub 87. Within sleeve 95 is the operating shaft 49 and within this shaft is the pilot valve 52, as previously explained.

The servomotor is operated by liquid under suitable pressure supplied through a duct 97 and, after passing through the motor, is returned to the liquid supply through a second duct 98. These ducts are shown extending upwardly and to the left of the vane motor in Figs. 3 and 4 but in the actual construction are at the bottom of the servomotor as shown in Fig. 13.

The operating liquid, such as oil, from the engine lubricating system, passes from inlet duct 97 through a hole 99 in bushing 94 (Figs. 4 and 6), thence through an elongated aperture or part 100, the purpose of which will appear later, in sleeve 95 and into a circular groove 101 in motor shaft 49. The oil then passes through a series of four holes 102 spaced around shaft 49 in the bottom of groove 101 and communicating with a second circular groove 103 in pilot valve 52.

Opening out of this second circular groove 103 are two diametrically opposite channels 104 (Figs. 4, 12 and 13) extending longitudinally of pilot valve 52. These channels extend a limited distance along the surface of the pilot valve to a point slightly beyond the center of the servomotor, as viewed in Fig. 13, and the oil from groove 103 enters and fills channels 104.

Figure 13:
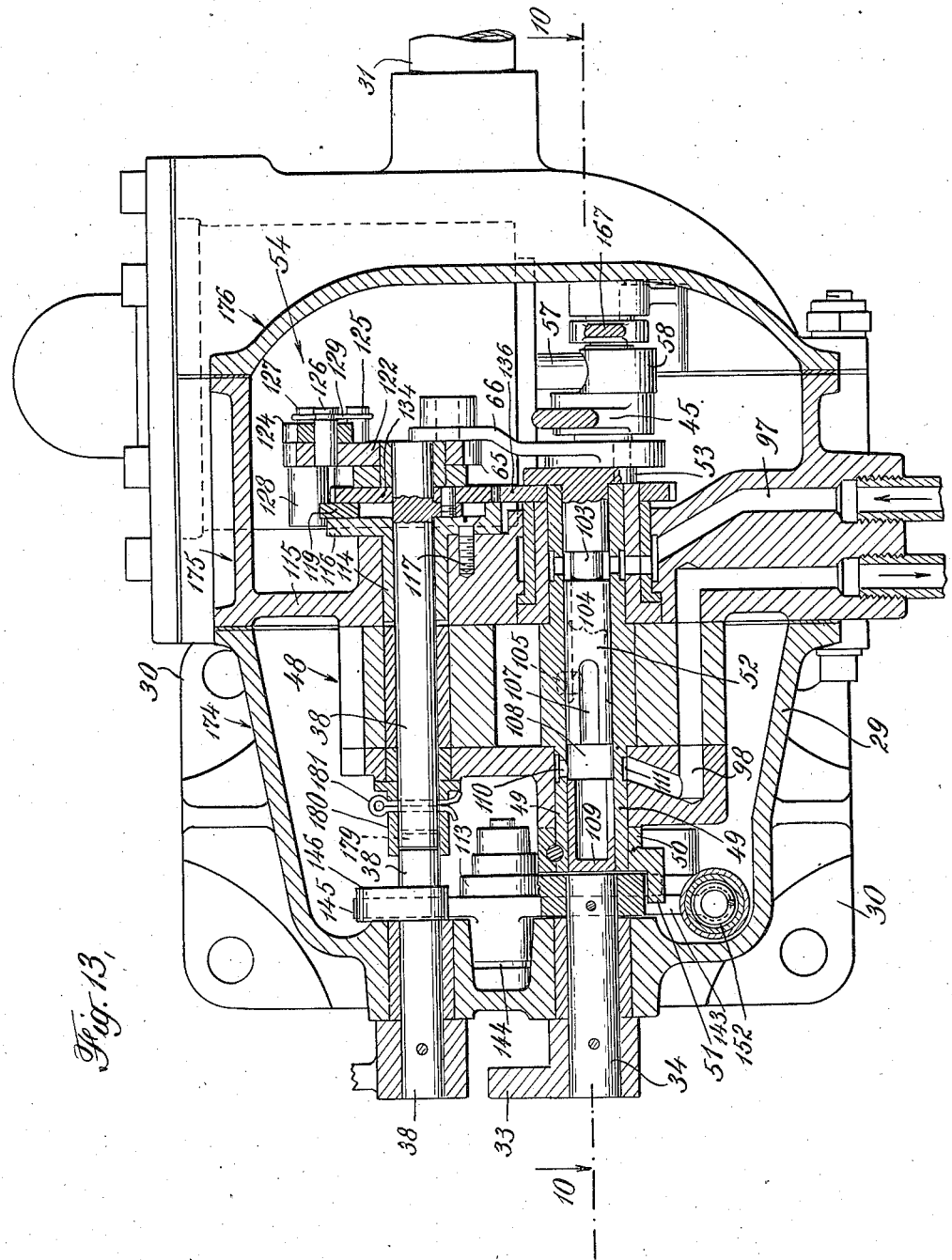
Fig. 13 is a vertical section taken on broken line 13—13 of Fig. 12 through the setting lever shaft and the servomotor shaft and pilot valve.
Figure 14:
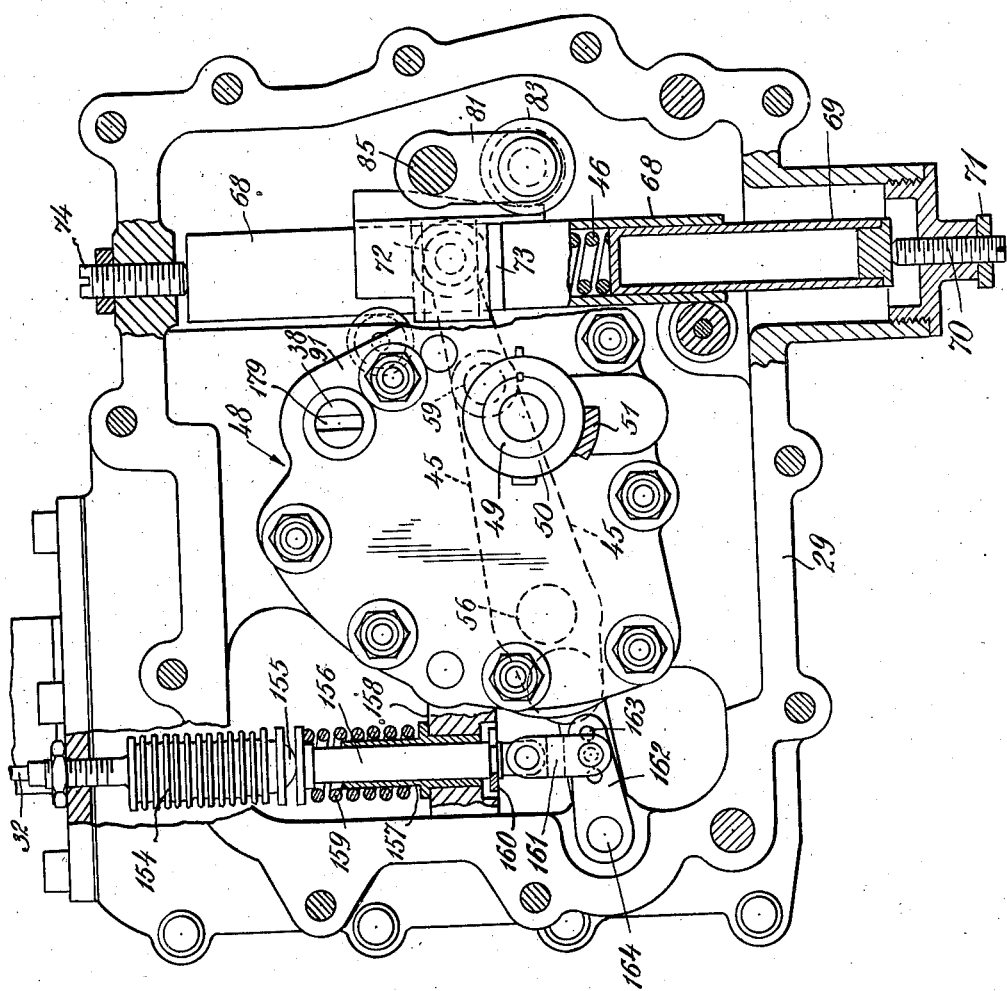
Fig. 14 is a vertical section taken on broken line 14—14 of Fig. 10 showing the main operating spring housing of the pressure responsive mechanism, and part of the temperature-compensating mechanism.

At right angles to channels 104 there are two similar outlet channels 107 which overlap channels 104 slightly as shown in Fig. 13 and which extend to the end of pilot valve 52 and communicate with a space 108 within hollow shaft 49 between the end of the pilot valve and a plug member 109 which seals the bore for the pilot valve. The oil leaving the servomotor passes through channels 107 to the spacing 108 and thence through a radial hole 110 to a circular groove 111 in the outer surface of sleeve shaft 49 and thence into outlet duct 98.

Figure 12:
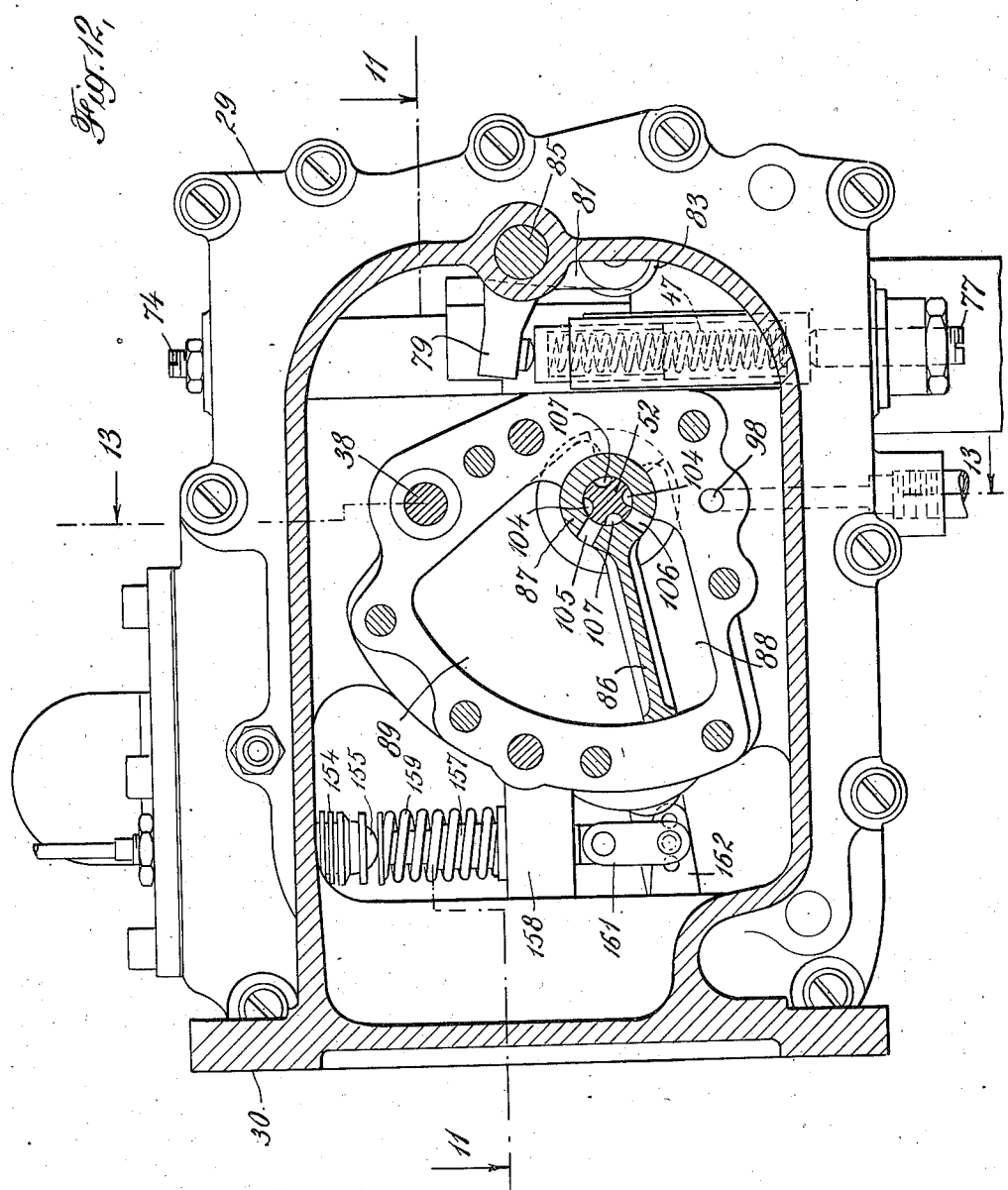
Fig. 12 is a vertical section taken on broken line 12—12 of Fig. 10 showing the interior of the servomotor and part of the temperature compensating mechanism.

Referring now to Fig. 12, should pilot valve 52 be turned slightly in the clockwise direction, the lower inlet channel 104 will be placed in communication with opening 106 on the lower side of vane 86 and opening 105 on the upper side of the vane will simultaneously be placed in communication with the left hand outlet channel 107. Oil will thus flow into lower compartment 88 below vane 86 and out of compartment 89 through opening 105 into outlet channel 107, thereby moving the vane until equilibrium is again restored by the closing off of the oil flow through openings 106 and 105. The reverse action takes place when pilot valve 52 is actuated in the opposite or counter-clockwise direction. The angular movement of vane 86, and motor shaft 49 will correspond precisely to the angular displacement of pilot valve 52.

Shaft 34, on the outer end of which pump control lever 33 is pinned, is mounted in axial alinement with motor shaft 49 (Figs. 3 and 13) and the part on shaft 34 which is engaged by driving lug 51 of driving member 50 on the end of shaft 49 comprises a shoulder 112, shown diagrammatically in Fig. 3 and constructionally in Fig. 15. This shoulder is formed on an arm 113 which is fixed to the inner end of shaft 34 in proximity to driving member 50. Driving lug 51 engages shoulder 112 to turn shaft 34 and actuate pump control lever 33, and through link rod 39 pump capacity lever 22 (Fig. 1). By means of helical spring 23 acting on lever 22 shoulder 12 is normally maintained in engagement with driving lug 51, but by this driving arrangement shoulder 112 can be moved away from lug 51, and, also the vane 86 of the servomotor can be moved to its zero or lowermost position under certain conditions, without causing capacity lever 22 of the fuel pump to be moved to its off position.

*The connecting and automatic leaning out mechanism*

The purpose of this mechanism indicated generally by numeral 54 is to connect the actuating link 62 of the pressure-responsive mechanism 43 with crank 53 of pilot control valve 52, as briefly indicated previously, and primarily to change the action of the fluid pressure responsive mechanism on the pilot valve 52 so as to alter the fuel-air mixture pattern throughout a portion of the power and operating range of the engine. The purpose of changing the fuel-air ratio pattern is to operate the engine on a leaner mixture under certain operating conditions, such, for example, as while operating within the cruising power range, and this mechanism provides for the manual setting by the pilot of the mixture control apparatus so as to cause the engine automatically to operate with a leaner mixture than that of the full rich mixture curve, as shown at A in Fig. 19, such change in setting, however, being automatically controlled so as to give the correct engine fuel-air ratio at different throttle openings.

The result of such a change in setting of the mixture control mechanism is indicated by curve B in Fig. 19 in which the fuel-air ratio mixture has been leaned out by a predetermined percentage from the maximum rich mixture curve throughout the various throttle positions from idling speed and power throughout the cruising range power. At throttle openings above this point, however, it is desirable to return the engine to operation on the full rich mixture characteristic or curve A, not only because at such wide throttle openings it is always desired to obtain maximum power from the engine but also to facilitate the cooling of the engine and avoid detonation at high power output.

As shown in Fig. 19, the minimum lean fuel-air ratio curve B commences to approach the full rich mixture curve A at the point X which is at approximately the end of the cruising power range, and it meets curve A at the point Y which is not substantially beyond this range. The mechanism under consideration not only causes this automatic return of the engine fuel-air ratio mixture from a lean mixture to the maximum rich mixture at the upper ranges of engine power, but also enables the pilot to select or set the automatic fuel control mechanism to maintain any desired fuel-air ratio pattern between the two curves A and B.

This mechanism 54 is positioned at the inner end of shaft 38, to the outer end of which setting lever 37 previously referred to is secured. The inner end of this shaft is mounted in a bushing 114 which is received within a bore in the thickened portion of an interior wall or web member 115 of housing 29 (Fig. 13) vertically above vane motor shaft 49. The right hand end of bushing 114 has an integral enlargement constituting a cam housing 116 which is fixed in adjustable position by means of a screw 117 (Figs. 13, 3a and 17).

In the outer face of housing 116 a pin 118 is fixed and on this pin is pivoted a leaning out cam 119. The active surface of this cam is to the left of pin 118 and the cam is rocked about the pin by means of two leg portions (Figs. 3a, 4 and 19) which straddle an eccentric 120 fixed on setting lever shaft 38. Hence by turning shaft 38 cam 119 may be shifted from the position shown in Fig. 3a, where the cam is flush with the circular outside surface of cam housing 116 (the full rich position) to the position shown in Fig. 17 (the minimum lean position) in which the cam projects a maximum distance outwardly from the surface of the cam housing. These positions all refer to the automatic portion or range of the mixture control mechanism and are indicated in Figs. 1 and 16 by the movement of levers 41 and 37 respectively in the 50° range to the right of the vertical. This range is also shown for lever 37 in Fig. 3 but this view is reversed with respect to the other two views.

The linkage which constitutes the remaining part of connecting and automatic leaning out mechanism 54 is mounted outwardly of cam housing 116 on the projecting end of shaft 38. This is a four-cornered linkage, as shown in Fig. 9, comprising two arms 121 and 122, each loosely pivoted on the end of shaft 38, and two short links 123 and 124 hinged respectively to arms 121 and 122 by means of hinge pins 125 and 126, and connected together at their opposite ends by a roller pin 127 on which a roller 128 is mounted at the rear of the linkage (Figs. 3, 4 and 13).

Arm 121 of this linkage constitutes one end of a bell crank lever, of which operating lever 64 (attached to link 62 from the pressure-responsive mechanism) constitutes the other arm. Arm 122 of this linkage constitutes one arm of a second bell crank lever of which valve-actuating lever 65 constitutes the other arm. By means of this four-cornered linkage the radial displacement of roller pin 127 with respect to shaft 38 which constitutes the pivot for arms 121 and 122 will cause the ends of arms 121 and 122 to approach or recede from one another, thereby causing bell crank lever 122—65 and 121—64 to be rocked or angularly displaced with respect to one another.

Leaning out cam 119 effects such displacement when it is adjusted to a position where it projects outwardly from the surface of cam housing 116. In order to maintain roller 128 in contact with the surface of cam housing 116, or cam 128, a spring 129 is mounted in a groove in the end of roller pin 127, the two arms of the spring being engaged respectively with hinge pins 125 and 126 and tending to force them apart.

Assuming that leaning out cam 119 is withdrawn to the full rich position shown in Figs. 3, 3a and 4, then, as lever 62 is pulled downwardly as bellows 44 is compressed from its minimum pressure position (15" Hg) to its maximum position (70" Hg) roller 128 will not be shifted radially, but will merely roll along the circular surface of cam housing 116, the approximate limits of its movement being indicated in Fig. 3a by the letter I (Idling) and F (Full throttle). Under these circumstances valve actuating lever 65 is given by the four-cornered linkage the same angular displacement as operating lever 64 is given by link 62, lever 65 moving upwardly as lever 64 moves downwardly.

Under these conditions, as the engine throttle is opened from its idling position to its full open position, and the manifold pressure varies as just indicated and the engine air consumption varies accordingly, the automatic mixture control mechanism will cause pilot valve 52 to be actuated in such a manner as to cause servomotor 48 to move driving lug 51 to turn shaft 34 against the tension of spring 23 (Fig. 1) to regulate or control the position of pump capacity lever 22 to cause the fuel-air ratio to follow the full rich mixture curve shown at A in Fig. 19.

Should mixture control lever 41 (Fig. 1) now be moved to the right, through an angle of 50° to the "automatic lean" position (the position which gives the minimum lean mixture), this will cause lever 37 (Fig. 16) to be shifted to the right from the dotted position to the full line position. Referring to Fig. 3, lever 37 will be moved to the left to the dot-and-dash line marked "auto lean." Shaft 38 will therefore be rotated and with it eccentric 120, thereby rocking leaning out cam 119 about its pivot pin 118 to the position shown in Fig. 17. During this rotation of shaft 138 eccentric 120 will move from the dotted line position of Fig. 17 to the full line position.

If we again assume that the bellows 44 is in its fully extended position corresponding to the minimum manifold pressure of 15" Hg, link 62 will hold operating lever 64 in its upper or idling position, and as the throttle is opened and the manifold pressure increases, lever 64 will again move downwardly and roller 128 will again move to the left from the position indicated by radial line I (Fig. 17) reaching radial line F when the pressure is at its maximum with the throttle fully open. During this movement, roller pin 127 will gradually be shifted outwardly as roller 128 moves along the surface of cam 119. This causes the fuel-air ratio pattern to follow that indicated by curve B in Fig. 19 from the idling position of the throttle corresponding to 15" Hg through the lower power range of the engine and the cruising power range up to the point X where roller 128 has reached the corner 130 of cam 119.

As the opening of the throttle is continued, raising the manifold pressure still higher, and shifting roller 128 still further to the left it descends along the straight portion of cam 119 to the left of corner 130 until the roller is again resting on the circular surface of cam housing 116. The four cornered linkage is abruptly expanded laterally by the inward radial movement of roller 128, and the fuel-air ratio is consequently abruptly increased along the curve XY of Fig. 19, raising the ratio to the full rich mixture. As the movement of the throttle continues toward wide open position beyond the point Y, the fuel-air ratio follows the full rich pattern A.

Thus if the aircraft should be operating at cruising speed, and an emergency, such as a steep climb, should require full power, the pilot can obtain such merely by moving the engine throttle and without having to adjust the mixture control lever 41, or any second lever.

Should the operating conditions of the aircraft be such as to require a fuel-air ratio richer than the minimum lean pattern of curve B (Fig. 19), the pilot can obtain such a mixture by shifting fuel control lever 41 to some intermediate position between the upright position of Fig. 1 and the "automatic lean" position which is 50° to the right. This movement places lever 37 and leaning out cam 119 in some intermediate position; that is to say, cam 119 instead of being lifted to the maximum extent shown in Fig. 17, is moved outwardly to some lesser degree. This adjustment, moreover, or change in setting of the automatic mixture control mechanism is a continuously variable adjustment rather than a step-by-step adjustment, so that any particular fuel-air ratio pattern (within the operating range of the engine) to meet any particular set of conditions, can be obtained by the simple movement of mixture control lever 41.

The manner in which the four-cornered linkage of connecting and leaning out mechanism 54 operates to control pilot valve 52 to produce a leaner mixture is illustrated in Figs. 18, 18a, 18b, 18c, 18d and 18e. Figs. 18 and 18a are both engine idling positions, one providing a rich idling mixture and the other a lean. In all six of these figures, the dot-and-dash line marked 0° indicates the angular position of the center of operating lever 64 when vane 86 of the servomotor is in its lowermost position corresponding to the 0° position of lever 33 (Fig. 16). Fuel injection pump 15 is so constructed that its capacity lever 22 moves through an angle of 65° from the "off" position to the position of maximum pump output. Pump control lever 33 and operating lever 64 of the leaning out mechanism are also arranged to operate through the same arc of 65°.

The control mechanism is so arranged that in adjusting the fuel-air ratio for idling speed of the engine, the center 63 of lever 64 is adjusted to the position approximately 6° to the left or below the datum lines marked 0° in the several Figs. 18. This adjustment is made by turning stop screw 74 (Figs. 3 and 14) for the casing 68 of main operating spring 46 and does not affect the fuel-air ratio at other speeds. The fuel-air ratio at idling speed can also be controlled by means of mixture control lever 41, as will be seen presently. The idling speed of the engine is adjusted by a combination of the idling mixture adjustment just referred to, and by adjusting a stop (not shown) limiting the closing of the air throttle 11.

Referring now to Fig. 18, the leaning out cam does not project above the surface of cam housing 116, so that roller 128 rests upon the circular surface of this housing. Under these conditions the center 131 of valve actuating lever 65 is diametrically opposite center 63 of operating lever 64 and hence has been moved upwardly and to the right 6° from the 0° or datum line. Hence the vane 86 of the servomotor has moved a distance corresponding to a 6° actuation of the pilot valve 52, and this opens the capacity levers 33 and 22 by that much.

Referring now to Fig. 18a, the lean mixture idling position, leaning out cam 119 has been moved outwardly by a movement of mixture control lever 41. This has resulted in an outward radial shifting of roller 128, but the extent of this movement is small because the roller is on the extreme right hand end of the active portion of cam 119. This radial movement of roller 128 has been sufficient, however, to draw hinge pins 125 and 126 slightly toward one another, thereby turning bell crank lever 122—65 with respect to bell crank lever 121—64 so as to shift center 131 back towards the 0° line by an angle of 2°. In other words, center 131 of actuating lever 65 has been backed off 2° from the 6° movement of operating lever 64, leaving a net actuating movement of only 4° of pilot valve 52. This means, therefore, that the fuel-air mixture of the engine is very much leaner than when the parts are in the position shown in Fig. 18. From Fig. 18a it will be understood that the fuel-air ratio at idling speed can be adjusted by moving the mixture control lever 41, as previously indicated, as well as by adjusting the idling adjusting screw 74.

In Figs. 18b, 18c, 18d and 18e the connecting and automatic leaning out mechanism are shown in different power positions corresponding to four different throttle openings. In Fig. 18b the air throttle 11 has been opened resulting in an increase in manifold pressure on bellows 44 sufficient to cause operating lever 64 to be moved downward 26° from the 0° line. Since cam 119 is in one of its outward positions to provide for automatic lean operation, along the pattern indicated by curve B of Fig. 19 or one of the similar patterns between this curve and curve A, roller 128 has been moved radially outward by cam 119 resulting in a backing off of center 131 of valve actuating lever 65 by 6° from the 26° line of operating lever 64. This leaves a net actuation of the pilot valve by lever 65 of 20°.

Similarly in Fig. 18c lever 64 has moved downward to an angle of 43° at which point roller 128 is at the left hand corner or end of leaning out cam 119, so that this roller is in its maximum outward position. In this position center 131 has been backed off 10° from the 43° line, leaving a net actuation of the pilot valve of 33°.

From this it will be understood that the wider the throttle opening, or, what is the same thing, the greater the movement of operating lever 64 by the fluid pressure responsive mechanism, the greater the backing off or reduction in net actuation of pilot valve 52, and that this alteration of the influence of operating lever 64 on the pilot valve is the same percentage of the movement of lever 64 throughout the range of operation from idling speed up to the 43° position of lever 64 where roller 28 is leaving the end of cam 119.

As the throttle is opened still further and operating lever 64 moves through another 5° to the 48° position, roller 128 has left the end of the cam 119 and again made contact with the circular surface of cam housing 116. Hence the 10° back off movement of center 131 of lever 65 shown in Fig. 18c has been restored and the angular movement of center 131 is now 48° corresponding with the angular movement of operating lever 64. From this point onward up to the full movement of 65° of operating lever 64, shown in Fig. 18e, the angular movements of center 131 and operating lever 65 continue to be equal.

Referring to Figs. 18c and 17, the degree of abruptness of the expansion of the four-cornered linkage by the inward movement of roller 128 as it passes the left hand corner 130 of cam 119 can be varied by changing the shape of corner 130 and the diameter of roller 128. This makes the change from operation along the lean ratio curve B (Fig. 19) to operation along curve A quicker or slower, changing the slope of the curve X—Y. The point in the fuel ratio curve where this change is to occur, that is to say, the location of the point X, can be adjusted by loosening screw 117 and turning cam housing 16 to a slightly different position, a slot being provided for screw 117 for this purpose. This, however, also changes the adjustment of the fuel-air ratio at idling speed, since it shifts the position of fulcrum 118 of cam 119 with respect to the idling position of roller 128 which is indicated by line I in Fig. 17. In order to adjust the position of point X without also changing the idling fuel-air ratio, cam 119 can be replaced with another cam having the corner 130 at a greater or less distance from fulcrum 118.

The maximum spread between the "automatic full rich" fuel-air ratio curve A (Fig. 19) and the "automatic minimum lean" curve B is determined by the stroke of eccentric 120 and by the length of the active surface of cam 119. If a greater spread is desired it can be obtained by replacing one or both of these parts.

When stopping the engine it is slowed down to idling speed by moving the air throttle to nearly closed position. When the engine has cooled sufficiently lever 41 is moved to fuel cut-off position and the ignition switched off. With the engine running at low idling speed the manifold pressure is around 15" Hg absolute, this varying from 12" to 18", depending upon the engine. Hence bellows 44 is at or near its fully extended position, thereby causing vane 86 of the servomotor to be moved to within a few degrees of its lowermost position. Pump control lever 33 will be moved to about the 6° position shown in Fig. 16. When the engine is making the last few revolutions and is about to stop, the manifold pressure increases because of the valve overlap. This compresses bellows 44 somewhat, with the result that it tends to move lever 33 downward away from the 6° idling position and thereby partially reopen the pump capacity control lever 22.

This is prevented, and levers 33 and 22 are moved to the full shut-off position, by the fuel shut-off mechanism. This mechanism first conditions the servomotor so that vane 86 can be moved manually, and then moves pump control lever 33 to the 0° or completely shut-off position. The movement of the levers is accomplished by means of a lug 132 (Fig. 16) formed at the side of lever 33 which is adapted to be engaged by the end of an adjustable actuating screw 133 positioned on the adjacent setting lever 37, when this lever is moved from the "automatic lean" position through the additional angle of 20° to the "fuel shut-off" position by the movement of mixture control lever 41.

The engagement of screw 133 with lug 132 takes place during the last part of the 20° movement of levers 41 and 37 just mentioned. During the first part of this movement the conditioning of the servomotor takes place. The operating oil pressure is cut off and compartments 88 and 89 on opposite sides of vane 86 are placed in communication with one another so as to allow lever 33 to be moved by hand from the 6° position to the zero position. This is accomplished by the following mechanism.

Between the outer face of cam housing 116 and the four cornered linkage above mentioned, there is a gear 134 (Figs. 4 and 11) of approximately the same diameter as the cam housing. This gear is rotated by shaft 38 through a driving pin 135 mounted in the side of eccentric 120 (Fig. 17) and received within a hole in gear 134. A similar gear 136 whose teeth mesh with those of gear 134 is mounted immediately below it on the outer end of sleeve shaft 49 of the servomotor so as to turn loosely on this shaft, but so as to cause the rotation of sleeve 95 (see Fig. 4).

In the side of sleeve 95 is port 100 (Figs. 6, 7 and 8) and flange 96 on the inner end of sleeve 95 has a cutaway portion 137 which is wider than the land 90 at the rear of hub 87 of the servomotor vane 86. During the first part of the 20° movement of mixture control lever 41 and setting lever 37 towards the fuel shut-off position, the rotation of shaft 38 causes, through gears 134 and 136 the rotation of sleeve 95 and this moves port 100 from the position shown in Fig. 7 in the clockwise direction to cut off the supply of operating liquid through inlet duct 97 to the servomotor as shown in Fig. 8. Cutaway portion 137 of flange 96 also moves to connect the two chambers 88 and 89, being centered opposite one end of land 90, thereby providing a liquid passage between compartments 88 and 89 on the opposite sides of vane 86.

Fig. 6 shows sleeve 95 in the position its port 100 occupies when setting lever 37 is vertical (at the end of the automatic range and the beginning of the manual emergency range). When setting lever 37 has been moved to the automatic lean, or 20° position, sleeve 95 has been turned to the position shown in Fig. 7 where an edge of port 100 partially cuts off the supply of oil from inlet duct 97. In Fig. 8 sleeve 95 has been moved still farther to completely cut off the oil supply.

*Fuel-air ratio control mechanism for quick acceleration*

It will be understood that during normal automatic operation of the mixture control mechanism, mixture control lever 41 and its connected setting lever 37 being positioned somewhere in the 50° "automatic" range, the driving lug 51 of the servomotor remains at all times in contact with shoulder 112, as shown, for example, in Figs. 15b, 15c and 15d. With the engine operating at idling speed or at any speed less than full throttle, should the pilot desire to open the throttle very quickly in order to obtain a sudden increase in power, a sudden shifting of the capacity control lever 22 of the pump towards its full capacity position would also be required if the engine is to respond instantly. Such shifting of lever 22 by the automatic control mechanism would occur when the increase in manifold pressure had operated on bellows 44 and the movement of the bellows had shifted pilot valve 52, and vane 86 of the servomotor had moved upwardly so as to cause lug 51 to turn arm 113. This, however, would require perhaps a second or two of time during which the engine would not receive enough fuel for it to accelerate properly.

In order to avoid this difficulty, provision is made for the momentary actuation of arm 113 and its connected levers 33 and 22 by any sudden opening movement of the air throttle, but not by any sudden closing movement thereof. This mechanism is illustrated in Figs. 3, 15, 10 and 11, and comprises an interconnecting mechanism between the air throttle, the automatic mixture control mechanism and the setting lever 37 operated by mixture control lever 41.

Shaft 36 for the air throttle connecting lever 35 extends through the side wall of housing 29 on the opposite side of this housing from bellows 44 (Figs. 11 and 3) and, fixed on its inner end, there is a short crank arm 138. This crank arm is connected at 140 by a short link 139 with the lower end of a floating pivot lever 141. The floating pivot 142 of this lever is mounted upon the lower arm 143 of an interconnecting lever which is pivoted at 144 to the wall of housing 29 above and to the left of shaft 36 as shown in Fig. 15. The upper arm 145 of this interconnecting lever is adapted to engage a manual control cam 146 which is fixed to shaft 38 of setting lever 37.

The upper end of floating pivot lever 141 is connected at 147 to a link 148, the left hand end of which is connected at 149 with arm 113, previously referred to as being fixed to the inner end of shaft 34 for the pump control lever 33. Arm 113 has at its lower portion the shoulder 112 which is engaged by driving lug 51 of the servomotor during operation of the automatic control.

The lower end of arm 143 of interconnecting lever is engaged by a plunger 150 which is telescoped into a spring housing 151 within which is a helical spring 152 that biases the lower end of arm 141 to the right as shown in Fig. 15. Spring housing 151 is threaded in an opening in housing 29 so that the compression of this spring may be adjusted from the outside of the housing and held in adjusted position by lock nut 153. Interconnecting lever 143—145 and helical spring 152 are shown in changed outline in the diagrammatic view, Fig. 3, for the sake of clarity.

Because of the mechanism just described, whenever the throttle lever 24 is operated to give sudden opening movement to air throttle 11, the movement of arm 138 by the throttle connection lever 35, through link 139, floating fulcrum lever 141 and link 148 moves arm 113 to the left (Fig. 15). This turns shaft 34 and pump control lever 33 moves in a direction to increase the output of fuel injection pump 15 exactly simultaneously with the increase in opening of the air throttle 11.

This movement of arm 113 causes shoulder 112 momentarily to move away from driving lug 51, but as soon as the automatic control has had time to function in response to the change in manifold pressure caused by the increased opening of the throttle, lug 51 advances again engaging shoulder 112 and opening the pump farther, and the automatic fuel-air ratio control is resumed. Thus, in the very short interval between the brisk opening of the throttle and the time the engine reaches the higher speed and manifold pressure corresponding to the new throttle opening, there is an enrichment of the mixture favorable to fast acceleration.

Should the pilot, after operating the engine at such an open throttle position, desire to suddenly cut off the engine or reduce the throttle opening by any amount, the control mechanism permits him to do so, but the sudden movement of arm 138 in the reverse direction, that is to say, to the left (Fig. 15) does not cause a corresponding movement of arm 113. This is impossible because shoulder 112 is in engagement with driving lug 51 and full operating oil pressure is being supplied to the servomotor. What happens is that when arm 138 moves to the left, the fulcrum 142 of floating fulcrum lever 141 is moved to the left, causing interconnecting lever 143, 145 to be rocked on its pivot in the clockwise direction compressing spring 152 sufficiently to permit the necessary movement of arm 138.

Manual emergency mixture control mechanism

While this mixture control mechanism is so arranged and constructed that there is very little possibility of mechanical failure, in order to illustrate the operation of the manual emergency control mechanism, two possible causes of failure of the automatic mechanism will be referred to: (1) failure of the bellows 44 and (2) failure of the servomotor oil supply.

Assuming that the engine is operating, say, at about maximum power and bellows 44 should crack, allowing the manifold pressure to leak into the bellows, the force tending to compress the bellows will have disappeared and springs 46 and 47 will cause the bellows to be fully expanded, actuating the pilot valve 52 and the servomotor vane 86 to their lowermost positions, thereby turning driving lug 51 backwards from the position shown in Fig. 15d to the position shown in Fig. 15. This would tend to cause pump capacity control lever 22 to move to the "off" position (since pump spring 23 biases shoulder 112 against lug 51) and would do so but for the floating fulcrum lever and linkage mechanism shown in Fig. 15. Instead, however, of entirely cutting off the supply of fuel to the engine, this mechanism permits arm 113, and consequently pump capacity control lever 22, to be moved back only to about the halfway position (Fig. 15). This keeps the engine operating but reduces the power sufficiently so that the pilot is immediately aware of the condition and can take steps to remedy the situation.

The mechanism shown in Fig. 15 and in Figs. 15a to 15g, inclusive, prevents the movement of arm 113 to its 0° position through the action of spring 152 on the lower arm of interconnecting lever 143—145 which shifts floating pivot 142 to the right until the upper end 145 of the interconnecting lever comes into engagement with the hub of manual control cam 146. This cam is in the position shown in Fig. 16, it being assumed that the mixture control mechanism has been operating in the "automatic rich" position, that is to say, with setting lever 37 in the dotted line position of Fig. 16 or the full line position of Fig. 15, these corresponding to the central position of mixture control lever 41 as shown in Fig. 1.

Spring 152 is of sufficient strength to move the parts against the tension of pump lever spring 23. Arm 113 is therefore held in the position shown in Fig. 15, that is, in approximately midposition, because of the fact that pivot 142 is maintained in the position shown by means of spring 152 and by the arm 138, which is held in the position shown by the movement of the throttle to full open position. Obviously if the throttle were not in full open position when the leak in the bellows 44 occurred, but was in some intermediate position, arm 113 would be moved to some position between the approximate half-way position, shown in Fig. 15, and the off position.

It will be understood from the above that during the operation of the mixture control mechanism in the "automatic" range, the upper arm 145 of the interconnecting lever is held out of contact with manual control cam 146, except when the control is in the fuel shut-off position, and that, in the event of failure of the automatic control mechanism, this arm will immediately move into contact with this cam.

The pilot having observed the condition of the engine, immediately shifts mixture control lever 41 from the "automatic" range shown at the right in Fig. 1 to the "manual emergency control" range shown at the left of this lever. This causes the rotation of manual control cam 146 in the clockwise direction in Figs. 15 and 15a–15g, inclusive. Since we are assuming that the engine was operating at full throttle, the pilot will desire to return the mixture control to the position to give him full engine power. He will therefore move lever 41 as far to the left (Fig. 1) as possible, or, in other words, to the "rich" position of the emergency control. This will cause cam 146 to turn to the position shown in Fig. 15g, thereby restoring by manual operation, interconnecting lever 143, 145 and arm 113 to the same positions that they occupied before the break in the bellows occurred (which positions are shown in Fig. 15d).

If the pilot desires to reduce the engine power he first reduces the throttle opening, for example, to half throttle or to idling position. Then he adjusts the manual mixture control lever 41 correspondingly and then moves the mechanism to the positions shown in Figs. 15f or 15e. From a comparison of Figs. 15e, 15f and 15g with Figs. 15b, 15c and 15d, it is evident that precisely the same control of the mixture can be obtained manually as automatically.

When the automatic mixture control is in operation and hand lever 41 is, therefore, in the "automatic" range, manual control cam 146 is rotated to the left or in the counterclockwise direction from the position shown in Figs. 15b, 15c and 15d, and hence does not in any way influence interconnecting lever 143, 145.

If the automatic mixture control should fail to operate not because of a leak in the bellows but because of failure of the oil supply to the servomotor, pilot valve 52 will continue to function normally under the action of the automatic mechanism, but the servovane 86 will not follow up the motion of the pilot valve. The mixture will lean out as in the case of bellows failure (but more slowly) because, with release of oil pressure on vane 86, pump spring 23 will cause shoulder 112 to push driving lug 51 backwards and vane 86 will move slowly toward the down or "off" position, the oil leaking past the clearance at the sides of the vane. The positions the parts will assume are shown in Fig. 15. The pilot will again assume control of the mixture manually, using the color of the exhaust, and other indicators to obtain the correct fuel-air ratio.

Fuel-air ratio control mechanism for starting the engine

If the engine is cold the servomotor has been drained of oil and when the engine starts the automatic control mechanism will not commence functioning immediately. Hence, it is necessary to set the pump capacity control lever 22 manually. This may be done in either of two ways, (1) by moving the air throttle to from two-thirds to full open position, or (2) by use of the manual mixture control lever 41.

When starting according to the first method, the opening of the throttle will place the floating fulcrum lever and linkage mechanism in the approximate position shown in Fig. 15, in which the arm 113 has been moved to about mid-position, thereby causing pump capacity lever 22 to be placed in about mid-position. The manual emergency control lever 41 is in mid-position and, consequently, setting lever 37 and manual control cam 146 are in mid-position between the "automatic" and "manual" ranges, as in Fig. 15. Driving lug 51 is at the 0° position as here shown, and, as soon as the engine commences firing, the servomotor liquid pressure system will be in operation and lug 51 will advance against shoulder 112 to assume automatic control of the mixture ratio. As soon as the engine starts the pilot must adjust the air throttle promptly to prevent too high an engine speed and to attain the proper speed for warming up the engine.

In case the pilot prefers to start a cold engine by using the manual mixture control, he adjusts the air throttle to slightly open position (see arm 138, Fig. 15a) and the manual mixture control lever 41 to "rich" in the "manual emergency" range. This causes cam 146 to rotate from the position shown in Fig. 15 to that shown in Fig. 15a. This moves the upper end of interconnecting lever 143, 145 to the right and, together with the opening of the throttle which moves arm 138 somewhat away from the 0° position, results in shifting arm 113 to about mid-position, thereby moving pump capacity lever 22 to about mid-position. When the engine commences firing the mixture control lever 41 is shifted to the "automatic" range and the throttle is adjusted until the desired warming up speed has been obtained.

With both methods of starting, the pump control lever 22 is operated manually to correspond with a much higher fuel output than normally required by the engine for running at low speed, so that a rich mixture is obtained which facilitates starting without requiring exaggerated priming in the manifold by means of a hand priming pump.

In starting a hot engine, the operator moves the mixture control lever 41 from the fuel shutoff position into the "automatic lean" position and barely cracks open the air throttle.

When starting a hot engine the whole servomotor and oil system is filled with oil and ready to operate at the first urging of the automatic control mechanism. The manifold pressure is 30" Hg corresponding to atmospheric pressure and it is likely that, as the manifold pressure rose to this figure when the engine stopped, there was still some oil pressure in the system. The servo-pilot valve 52, therefore, has probably been moved to a position corresponding to 30" Hg.

Cranking the engine at low speed by means of the starter does not materially change the pressure in the manifold, so that the bellows remains partly compressed corresponding to atmospheric pressure. Although the oil pressure to the servomotor builds up promptly, the engine will thus be supplied momentarily with a rich mixture which facilitates starting. As soon as the engine fires, the manifold pressure goes down, the bellows 44 expands and the control mechanism automatically reduces the fuel-air ratio to its proper value for idling speed.

Temperature compensating mechanism

Up to this point it has been assumed that main actuating link 62 (Figs. 3 and 9) was connected directly to main actuating lever 45, or what amounts to the same thing, that triangular, or bell crank, lever 60 was temporarily fixed with respect to lever 45. The temperature compensating mechanism operates by rocking bell crank lever 60 on its pivot 59, thereby shifting hinge 61, between this lever and link 62, with respect to lever 45. Such rocking movement of lever 60 has the effect of increasing or diminishing the extent to which the pilot valve 52 of servomotor 48 is actuated by main actuating lever 45 of the pressure-responsive mechanism 43. This increases or diminishes the regulating movement of pump capacity lever 22 by the automatic fuel control mechanism.

As previously explained in connection with Fig. 1, one or more temperature-responsive elements which operate by the expansion of liquid are placed within manifold 3 subject to the variations in temperature of the air and fuel mixture (in the case of non-timed injection) after it has passed through the supercharger and, hence, after its temperature has been raised by the heat of compression. This temperature will vary correspondingly to the fluid pressure within manifold 3, which in turn depends upon the extent to which air throttle 11 is opened. The temperature within manifold 3 will also depend on the temperature of the atmosphere which will vary widely with changes in climatic conditions and with change in altitude. Since, with an aircraft engine equipped with a supercharger, the manifold pressure is, within certain limits, independent of altitude, compensation for variation in manifold temperature also compensates for change in altitude.

The expansion of the liquid within the temperature responsive bulb or bulbs within manifold 3 is communicated through tube 32 (Figs. 1, 3 and 14) to a small metallic bellows 154 within housing 29. The lower rounded end 155 of this bellows engages the upper end of a rod 156 which is slidable vertically in a sleeve 157 mounted in an aperture in a horizontal interior web portion 158 of housing 29. Rod 156 is biased upwardly by means of a spring 159 and when bellows 154 contracts sufficiently (which it does at the lower temperatures), its end 155 withdraws from contact with the upper end of rod 156, the upward motion of this rod being stopped by means of a collar 160.

A short link 161 pivoted to the lower end of rod 156 transmits its motion to a short arm 162. This arm has a series of holes 163 into any of which the lower end of link 161 may be connected so as to provide a means of adjustment to adapt the mechanism for engines having different manifold temperatures. Arm 162 is fixed to the inner end of a shaft 164 (Fig. 10) and on the outer end of this shaft an arm 165 is pinned. Shaft 164 is supported for rocking movement in a part of housing 29 substantially on a horizontal line passing through the fulcrum 56 of main actuating lever 45 of the fluid pressure responsive mechanism 43 and to the right of hinge 58, between the connecting rod 57 of bellows diaphragm 44 and actuating lever 45 (Fig. 9).

The left hand end of arm 165 extends to the left of fulcrum 56 and terminates in a boss carrying a hinge pin whose center is indicated by numeral 166. By means of this hinge pin a link 167 is connected to arm 165. The opposite end of this link is joined to bell crank lever 60 by means of a hinge pin whose center is indicated by numeral 168. This connection is below pivot 59 by which a bell crank 64 is mounted on actuating lever 45 and also below the connection 61 between this lever and link 62.

Referring now to Fig. 21, the center line of main actuating lever 45, when this lever is in its uppermost position is indicated by the dot and dash line. When lever 45 is in this position operating lever 64 of the four cornered linkage comprising the interconnecting and leaning out mechanism 54 is in its uppermost or idling (6°) position corresponding to the 6° position of pump capacity lever 22. The lowermost (full throttle) position of the center line of lever 45 is indicated by the dotted line and when the lever is in this position operating lever 64 has been turned to the 60°, 65° or 70° position, depending upon the position of temperature responsive arm 165, thereby causing movement of pump control lever 22 correspondingly. The angle between the dot and dash line and the dotted line just referred to indicates the angular travel of actuating lever 45.

The position of hinge center 166 of temperature responsive arm 165 is lowered or raised according to the degree of expansion of bellows 154 as determined by the temperature in manifold 3. The position of center 166 is indicated in Fig. 21 for temperatures ranging from 50°, the point at which shoulder 160 stops the upward movement of rod 156, to 250° which is the maximum operating temperature of the particular engine illustrated in the drawings. With engines of higher or lower operating temperature link 161 can be shifted to a different hole 163 in arm 162.

As the engine warms up at any given throttle setting, the downward movement of hinge center 166 causes link 167 to turn bell crank lever 60 on its pivot 59, thereby shifting hinge center 61, by which link 62 is connected to lever 60, upwardly. This diminishes the extent by which main actuating lever 45 has moved operating lever 64, thus reducing the amount of fuel supplied to the engine. Should the engine temperature decrease after operating at a high temperature, the reverse action will take place, resulting in an increase in the amount of fuel supplied to the engine for that particular throttle opening, or position of actuating lever 45.

One of the problems in temperature compensation is to maintain the same fuel-air ratio pattern throughout the range of manifold pressure variation even though the manifold temperature does not change as fast as the pressure. For example, supposing it is desired to maintain the temperature pattern shown in curve A of Fig. 19. To accomplish this the temperature responsive bellows 154 and the linkage mechanism above described are so arranged that, as the manifold temperature increases from the engine operating temperature at manifold pressure corresponding to idling speed, to the operating temperature corresponding to the manifold pressure at full speed and power (wide open throttle) and lever 45 moves simultaneously from idling speed position to its lowermost or full throttle position, there will be no relative motion between bell crank lever 60 and main actuating lever 45. This is done by making the travel of hinge center 166 of temperature responsive arm 165 between these two normal operating temperatures, say, for example 100° (idling speed temperature) and 200° (full throttle temperature) substantially coextensive with the angular movement of lever 45, the movement of hinge center 166 being approximately proportional to the increase in the manifold temperature.

Under these conditions, let us assume that the engine is operating at idling speed and a manifold temperature of 100° (the normal operating temperature for this speed), and that the throttle is opened by the pilot, say, to full throttle position. The actuating lever 45 promptly commences to move downwardly as the manifold pressure increases, so as to supply fuel in accordance with curve A of Fig. 19. The hinge center 166 also promptly commences to move downwardly, since the thermostat bellows 154 responds to the higher temperature of the air caused immediately by the increase in pressure in the manifold.

Under the usual conditions of the opening of the throttle by the pilot, the hinge center 166 will move downwardly at substantially the same rate as that of lever 45, center 166 remaining substantially on the center line 59—56 of this lever. Hence the connecting hinge center 61 between bell crank lever 60 and link 62 will also remain substantially on the center line 59—56 of lever 45, so that there will be no relative motion of levers 60 and 45. The fuel-air ratio will consequently be maintained on curve A throughout the entire opening movement of the throttle, that is to say, during the movement of lever 45 from the dot-and-dash center line position of Fig. 21 to the dotted position.

When lever 45 is in its lowermost position corresponding to the dotted center line, lever 60, under the conditions assumed above, will also be in the position corresponding to the dotted triangle which represents the corners of the three pivot centers 59, 61 and 166. Should the manifold temperature be higher than the normal temperature of 100° at the commencement of the opening of the throttle, then the expansion of the temperature responsive bellows 154 will cause hinge center 166 to move downward faster than lever 45. This will cause bell crank lever 60 to rock in a clockwise direction around pivot 59, pushing link 62 upwardly with respect to lever 45 and diminishing the output of fuel pump 15 by the amount necessary to keep the fuel-air ratio on curve A.

On the other hand, should the manifold temperature be lower than normal at the commencement of the opening of the throttle, under the conditions above assumed, then bellows 154 will expand less and hinge center 166 will lag behind the downward movement of lever 45, causing bell crank lever 60 to turn in a counterclockwise direction about pivot 59, thereby pulling link 62 downwardly with respect to lever 45 and increasing the output of the fuel pump by the amount necessary to keep the fuel-air ratio on curve A.

Since bellows 154 responds primarily to the temperature of the fluid in manifold 3 and to the temperature of this fluid after its pressure has been raised by the supercharger, and since this temperature varies almost instantaneously with the change in pressure, the rocking of bell crank lever 60 in one direction or the other will take place quickly. Therefore, any displacement of hinge center 61 from alinement with center line 59—56 of lever 45 will be quickly erased.

There remains to be mentioned the cockpit throttle arrangement and various constructional features of the mixture control apparatus.

With the apparatus of the present invention, the disposition of the master levers at the pilot's position in the cockpit remains substantially unchanged from that which has been adopted more or less as a "standard" arrangement of these levers. Referring to Fig. 1, master throttle lever 24 and mixture control lever 41, while, for clarity of illustration, shown separated somewhat, are actually located side by side, with their pivots 45 and 22 in alinement so that they can be manipulated by one hand. The only difference from the standard arrangement is that mixture control lever 41 has a longer travel in order to provide the three ranges, namely, the automatic range, the manual range and the fuel cut-off range.

An important feature in connection with lever 41 is the placing of the automatic range intermediate between the manual range and the fuel cut-off range, and the construction of the mechanism within housing 29 to permit this location. Such a layout enables the pilot to shift directly from the automatic range, where most of the operating is done, to either the manual range or to the fuel cut-off range.

To provide for safety in the operation of the lever 41, the latch and quadrant construction shown in Fig. 2 are provided. Lever 41 has a latch 169 biased upwardly by means of a spring 170 and arranged to be actuated by a button 171 at the top of the handle. It is adapted to engage two shoulders 172 and 173 on the inside of the quadrant member 174, actually nearly semi-circular in shape. Shoulder 172 is placed at the position of lever 41 which forms the boundary between the automatic range and the manual emergency range, while shoulder 173 is at the opposite boundary of the automatic range next to the fuel cut-off range. Hence the pilot is required to release latch 169 by pushing inwardly on button 171 whenever he desires to move lever 41 out of the automatic range, but he may move lever 41 into the automatic range from either of the other two ranges without depressing this button.

This arrangement prevents the pilot from leaning out the mixture too far and unintentionally cutting out the operation of the servomotor and putting the automatic control out of action. If he should attempt to move lever 41 in the opposite direction to obtain a richer mixture than the control will provide, he is warned when he has reached the normal richest mixture in the automatic range, by the engagement of latch 169 with stop 172. When starting the engine the pilot merely moves the throttle from the fuel cut-off position into whatever position he desires for starting, and if he uses the method described above in which lever 41 is left in the automatic range, it is not necessary for him to push down on button 171 in setting the lever for starting.

The constructional features of the mechanism are shown more particularly in Figs. 9 to 14, inclusive. Housing 29 is made in three sections, namely, a fixed section 174 (Fig. 10), an intermediate section 175 and a cover section 176. Fixed section 174 carries the flange 30 by which the device is mounted on the engine. Intermediate section 175 and cover section 176 together carry all of the principal parts of the automatic control mechanism including pressure responsive bellows 64 and its connected fluid pressure responsive mechanism 43, the temperature responsive bellows 154 and the mechanism actuated thereby, the interconnecting and leaning out mechanism 54 and the servomotor 48. The linkage mechanism (including floating pivot lever 141) interconnecting the air throttle, the pump control lever 33 and setting lever 37 for the automatic mixture control mechanism and the manual emergency control mechanism, is mounted on the fixed section 174. By dividing the mechanism in this manner, the inspection, adjustment and replacement of parts is greatly facilitated.

Cover section 176 is secured to intermediate section 175 by means of a series of bolts 177 so that the cover can be removed from the intermediate section for inspection and adjustment of certain parts of the pressure responsive mechanism and the temperature responsive mechanism including lever 45, arm 165, link 167, etc., as illustrated in Fig. 9. Both the cover and the intermediate section 175 are secured to the fixed section 174 by a second series of bolts, such as bolt 178 (Fig. 10). By removing this series of bolts the two sections and most of the interior mechanism can be removed, leaving only the fixed or flanged section 174 in position, together with the interconnecting linkage and lever mechanism previously referred to.

Figure 11:
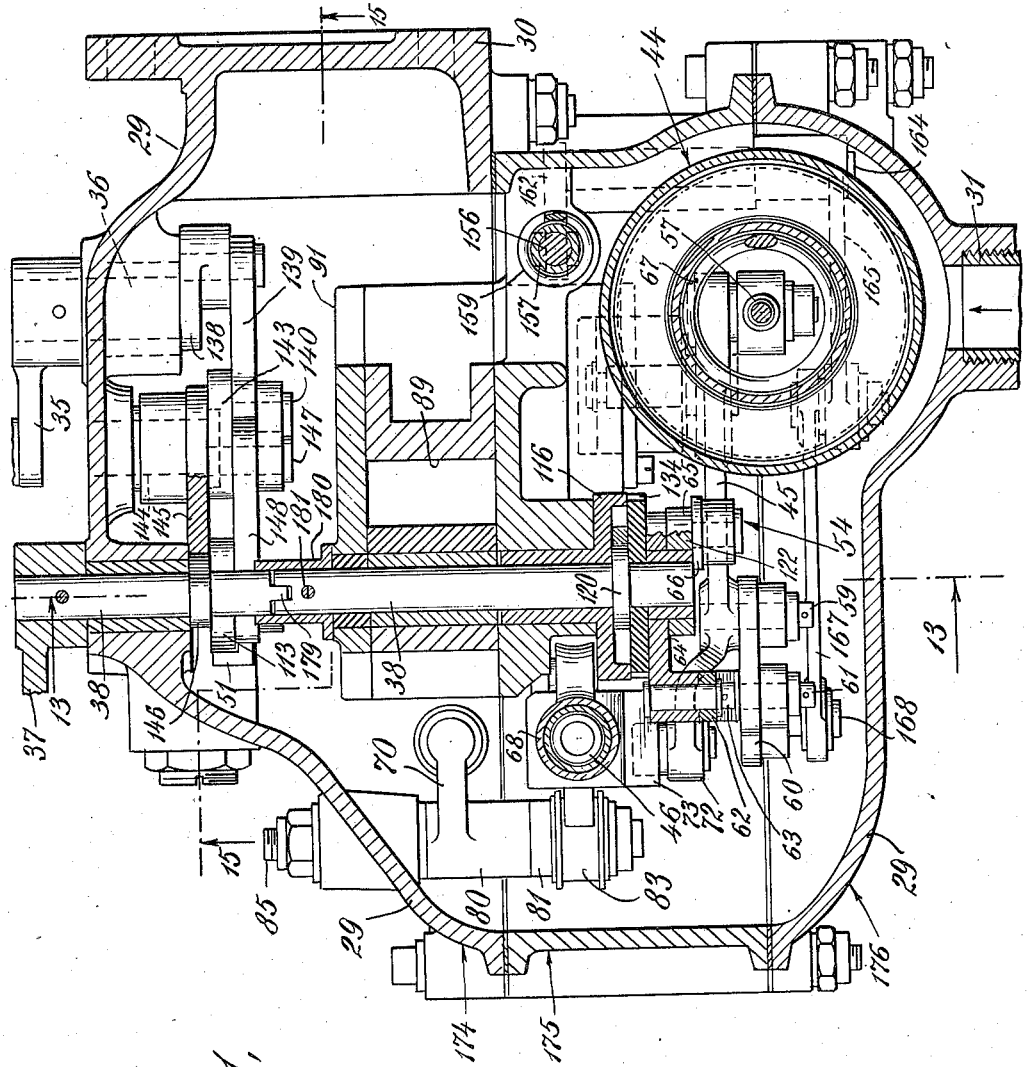
Fig. 11 is a horizontal section taken on broken lines 11—11 of Figs. 12 and 9 through the shaft for the hand setting lever.

In order to permit such disassembly, shaft 38 for the setting lever 37 is made in separable sections as shown in Figs. 11 and 13. These are interconnected by means of a tongue 179 on one part of shaft 38 and a corresponding groove in the other section. This groove and tongue joint may be surrounded by a sleeve 180 held in place by a cotter pin 181. Driving lug 51 of the servomotor which is on driving member 50 secured to the end of the servomotor shaft 29, is in proper operative position with respect to shoulder 112 of arm 113 when the intermediate section 175 is mounted in position on fixed section 174.

By means of this construction the entire operating parts of the automatic mixture control mechanism can be replaced as a unit without disturbing the linkages to the fuel pump or to the pilot's position.

The improved automatic mixture control mechanism has a number of advantages in addition to those already mentioned. It is an extremely compact and light-weight unit. Its operation is not influenced by any degree of "ram" in the air supply conduit. It eliminates all difficulties caused by the presence of obstructing elements in this conduit which are necessary with certain types of automatic mixture control mechanisms, particularly those which operate on the "mass air flow" principle. The fuel-air ratio can be adjusted manually by the pilot to obtain proper operation at idling speed, should the idling speed mixture ratio adjustment (screw 74) not be set properly. The fuel-air mixture is enriched to provide proper conditions for fast acceleration of the engine, either from idling speed or from any other speed, without the necessity of providing a separate or additional fuel injection nozzle and its adjuncts. This is of especial importance in connection with engines using timed injection, since injection of fuel into the air supply conduit is impossible.

The present embodiment of the invention has been illustrated in the drawings and described above in considerable detail, and accordingly it will be understood that the invention is not limited to the details of the particular mechanism shown and described but that a considerable number of modifications may be made in the mechanism without departing from the spirit of the invention, its scope being set forth in the appended claims.

I claim:

1. In combination with an engine having an air supply conduit, a throttle therein and fuel supply means having an output proportional to the engine speed and whose output at any given speed is variable, a fluid pressure responsive device subject to the fluid pressure in said conduit between the throttle and the engine and acting to regulate the output of said fuel supply means to control the ratio of the engine fuel and air in response to variations in such pressure, resilient means providing a force influencing the action on said pressure responsive device of such pressure and auxiliary means automatically effective during the operation of said resilient means to yieldingly influence said pressure responsive device by a varying amount and produce variations of the fuel-air ratio as said pressure varies.

2. In combination with an engine having an air supply conduit, a throttle therein and a fuel injection pump driven by the engine and whose output at any given speed is variable, a fluid pressure responsive device subject to the fluid pressure in said conduit between the throttle and the engine and acting to regulate the output of said pump to control the ratio of the engine fuel and air in response to variations in such pressure, resilient means providing a force opposing the action on said pressure responsive device of such pressure and auxiliary means automatically effective during the operation of said resilient means to yieldingly influence said pressure responsive device by a varying amount and produce variations of the fuel-air ratio as said pressure varies.

3. In combination with an engine having an air supply conduit, a throttle therein and a fuel injection pump driven by the engine and whose output at any given speed is variable, a fluid pressure responsive device subject to the fluid pressure in said conduit between the throttle and the engine and acting to regulate the output of said pump to control the ratio of the engine fuel and air in response to variations in such pressure throughout the range of such pressure variation of the engine, resilient means providing a force opposing the action thereon of such pressure and auxiliary means automatically effective during the operation of said resilient means to yieldingly influence said pressure responsive device by a varying amount and produce variations of the fuel-air ratio as said pressure varies.

4. In combination with an engine having an air supply conduit, a throttle therein and a fuel injection pump driven by the engine and whose output at any given speed is variable, a fluid pressure responsive device subject to the fluid pressure in said conduit between the throttle and the engine and acting to regulate the output of said pump to control the ratio of the engine fuel and air in response to variations in such pressure throughout a predetermined range, resilient means providing a force opposing the action thereon of such pressure and auxiliary means automatically effective during the operation of said resilient means to yieldingly influence said pressure responsive device by a varying amount and produce a higher fuel-air ratio at the lower and higher portions of said pressure range than at the mid-portion thereof.

5. In combination with an engine having an air supply conduit, a throttle therein and a fuel injection pump driven by the engine and whose output at any given speed is variable, a fluid pressure responsive device subject to the fluid pressure in said conduit between the throttle and the engine and acting to regulate the output of said pump to control the ratio of the engine fuel and air in response to variations in such pressure, said engine having as a characteristic the variation of the fuel-air ratio in a particular manner with changes in such pressure, resilient means providing a force opposing the action on said device of such pressure and mechanism for modifying said opposing force to produce variation of the fuel-air ratio according to the said engine characteristic, said means including a replaceable force-changing device arranged between said resilient means and said pressure responsive device, whereby by replacing said force-changing device with another of different species said pressure responsive device can be made to vary the fuel-air ratio to suit the said characteristic of a different engine.

6. In combination with an engine having an air supply conduit, a throttle therein, a manifold, and a fuel injection pump driven by the engine and whose output in any given speed is variable, a fluid pressure responsive device subject to the fluid pressure in said manifold and acting to regulate the output of said pump to control the ratio of engine fuel and air in response to variations in the manifold pressure, said engine having as a characteristic the variation of the fuel-air ratio in a particular manner with changes in the manifold pressure, resilient means providing a force influencing the action on said device of such pressure and a force-changing device arranged between said resilient means and said pressure responsive device to cause said pressure responsive device to vary the fuel-air ratio to suit the said characteristic of the engine.

7. In combination with an engine having an air supply conduit, a throttle therein and fuel supply means having an output proportional to the engine speed and whose output at any given speed is variable, a fluid pressure operated mechanism responsive to the pressure in said conduit between the throttle and the engine and acting on the fuel supply means to control the output thereof throughout the range of such pressure variation of the engine to vary the ratio of the engine fuel and air according to a predetermined pattern and connecting and leaning out mechansm between the pressure operated mechanism and the fuel supply means for changing the action of the pressure responsive mechanism on the fuel supply means according to a similar pattern throughout a predetermined part of said pressure range but altering the ratio of fuel and air by a predetermined proportion.

8. In combination with an engine having an air supply conduit, a throttle therein and fuel supply means having an output proportional to the engine speed and whose output at any given speed is variable, a fluid pressure operated mechanism responsive to the pressure in said conduit between the throttle and the engine and acting on the fuel supply means to control the output thereof throughout the range of such pressure variation of the engine to vary the ratio of the engine fuel and air according to a predetermined pattern and mechanism for changing the action of the pressure responsive mechanism on the fuel supply means according to a similar pattern affording a different ratio of fuel and air throughout a predetermined part of said pressure range, said mechanism including means for eliminating said change substantially at the end of said predetermined part of the pressure range.

9. In combination with an engine having an air supply conduit, a throttle therein and fuel supply means having an output proportional to the engine speed and whose output at any given speed is variable, a fluid pressure operated mechanism responsive to the pressure in said conduit between the throttle and the engine and acting on the fuel supply means to control the output thereof throughout the range of such pressure variation of the engine to vary the ratio of the engine fuel and air according to a predetermined pattern and connecting and leaning out mechanism between the pressure operated mechanism and the fuel supply means for changing the action of the pressure responsive mechanism on the fuel supply means according to a similar pattern affording a different ratio of fuel and air throughout a part of said pressure range commencing with that corresponding to idling speed and power and extending through that corresponding to cruising speed and power.

10. In combination with an engine having an air supply conduit, a throttle therein and fuel supply means having an output proportional to the engine speed and whose output at any given speed is variable, a fluid pressure operated mechanism responsive to the pressure in said conduit between the throttle and the engine and acting on the fuel supply means to control the output thereof throughout the range of such pressure variation of the engine to vary the ratio of the engine fuel and air according to a predetermined pattern and mechanism for changing the action of the pressure responsive mechanism on the fuel supply means according to a similar pattern affording a different ratio of fuel and air throughout a part of said pressure range commencing with that corresponding to idling speed and power and extending through that corresponding to cruising speed and power, said mechanism including means promptly to eliminate said change when a pressure above that corresponding to maximum cruising speed and power is reached.

11. In combination with an engine having an air supply conduit, a throttle therein and fuel supply means having an output proportional to the engine speed and whose output at any given speed is variable, a fluid pressure operated mechanism responsive to the pressure in said conduit between the throttle and the engine and acting on the fuel supply means to control the output thereof throughout the range of such pressure variation of the engine to vary the ratio of the engine fuel and air according to a predetermined pattern affording a rich ratio and connecting and leaning out mechanism between the pressure operated mechanism and the fuel supply means for diminishing the action of the pressure responsive mechanism on the fuel supply means according to a similar pattern affording a lean ratio throughout a part of said pressure range.

12. In combination with an engine having an air supply conduit, a throttle therein and fuel supply means having an output proportional to the engine speed and whose output at any given speed is variable, a fluid pressure operated mechanism responsive to the pressure in said conduit between the throttle and the engine and acting on the fuel supply means to control the output thereof throughout the range of such pressure variation of the engine to vary the ratio of the engine fuel and air according to a predetermined pattern affording a rich ratio, and connecting and leaning out mechanism between the pressure operated mechanism and the fuel supply means for diminishing the action of the pressure responsive mechanism on the fuel supply means according to a similar pattern affording a lean ratio throughout a part of said pressure range commencing with that corresponding to idling speed and power and extending through that corresponding to cruising speed and power.

13. In combination with an engine having an air supply conduit, a throttle therein and fuel supply means having an output proportional to the engine speed and whose output at any given speed is variable, a fluid pressure operated mechanism responsive to the pressure in said conduit between the throttle and the engine and acting on the fuel supply means to control the output thereof throughout the range of such pressure variation of the engine to vary the ratio of the engine fuel and air according to a predetermined pattern affording a rich ratio and mechanism for diminishing the action of the pressure responsive mechanism on the fuel supply means according to a similar pattern affording a lean ratio throughout a part of said pressure range commencing with that corresponding to idling speed and power and extending through that corresponding to cruising speed and power, said mechanism including means promptly to terminate said diminished action when pressure above that corresponding to maximum cruising speed and power is reached.

14. In combination with an engine having an air supply conduit, a throttle therein and fuel supply means having an output proportional to the engine speed and whose output at any given speed is variable, a fluid pressure operated mechanism responsive to the pressure in said conduit between the throttle and the engine and acting on the fuel supply means to control the output thereof throughout the range of such pressure variation of the engine to vary the ratio of the engine fuel and air according to a predetermined pattern affording a desired ratio, connecting and leaning out mechanism between the pressure operated mechanism and the fuel supply means for diminishing the action of the pressure responsive mechanism on the fuel supply means according to a similar pattern affording a proportionately leaner ratio throughout a predetermined part of said pressure range and means for changing said diminishing action to select similar patterns affording different ratios of the engine fuel and air.

15. In combination with an engine having an air supply conduit, a throttle therein and fuel supply means having an output proportional to the engine speed and whose output at any given speed is variable, a fluid pressure operated mechanism responsive to the pressure in said conduit between the throttle and the engine and acting on the fuel supply means to control the output thereof throughout the range of such pressure variation of the engine to vary the ratio of the engine fuel and air according to a predetermined pattern affording a desired ratio, connecting and leaning out mechanism between the pressure operated mechanism and the fuel supply means for diminishing the action of the pressure responsive mechanism on the fuel supply means according to a similar pattern affording a leaner ratio throughout a predetermined part of said pressure range and means for continuously varying said diminishing action to select similar patterns affording any desired ratio of the engine fuel and air within the compass of said mechanism.

16. In combination with an engine having an air supply conduit, a throttle therein and fuel supply means having an output proportional to the engine speed and whose output at any given speed is variable, a fluid pressure operated mechanism responsive to the pressure in said conduit between the throttle and the engine and acting on the fuel supply means to control the output thereof throughout the range of such pressure variation of the engine to vary the ratio of the engine fuel and air according to a predetermined pattern affording a desired ratio, mechanism for diminishing the action of the pressure responsive mechanism on the fuel supply means according to a similar pattern affording a leaner ratio throughout a predetermined part of said pressure range, said mechanism including means promptly to terminate said diminished action when a pressure above that corresponding to maximum cruising speed and power is reached and means for changing said diminishing action to select similar patterns affording different ratios of the engine fuel and air.

17. In combination with an engine having an air supply conduit, a throttle therein and fuel supply means having an output proportional to the engine speed and whose output at any given speed is variable, a fluid pressure operated mechanism responsive to the pressure in said conduit between the throttle and the engine and acting on the fuel supply means to control the output thereof throughout the range of such pressure variation of the engine to vary the ratio of the engine fuel and air according to a predetermined pattern affording a desired ratio, mechanism for diminishing the action of the pressure responsive mechanism on the fuel supply means according to a similar pattern affording a leaner ratio throughout a predetermined part of said pressure range, said mechanism including means promptly to terminate said diminished action when a pressure above that corresponding to maximum cruising speed and power is reached and means for continuously varying said diminishing action to select similar patterns affording any desired ratio of the engine fuel and air within the compass of said mechanism.

18. In combination with an engine having an air supply conduit, a throttle therein and fuel supply means having an output proportional to the engine speed and whose output at any given speed is variable, a fluid pressure operated mechanism responsive to the pressure in said conduit between the throttle and the engine and acting on the fuel supply means to control the output thereof throughout the range of such pressure variation of the engine to vary the ratio of the engine fuel and air according to a predetermined pattern affording a maximum rich ratio, mechanism for diminishing the action of the pressure responsive mechanism on the fuel supply means according to a similar pattern affording a leaner ratio throughout a predetermined part of said pressure range, said mechanism including means promptly to terminate said diminished action when a pressure above that corresponding to maximum cruising speed and power is reached and means for changing said action to select similar patterns affording different ratios of the engine fuel and air, said selected ratio being maintained automatically throughout said predetermined part of the pressure range and up to the engine speed and power at which said diminished action is terminated, the maximum rich ratio being thereafter automatically maintained up to full speed and power.

19. In combination with an engine having an air supply conduit, a throttle therein and fuel supply means having an output proportional to the engine speed and whose output at any given speed is variable, a fluid pressure operated mechanism responsive to the pressure in said conduit between the throttle and the engine and acting on the fuel supply means to control the output thereof throughout the range of such pressure variation of the engine to vary the ratio of the engine fuel and air according to a predetermined pattern affording a maximum rich ratio, mechanism for diminishing the action of the pressure responsive mechanism on the fuel supply means according to a similar pattern affording a leaner ratio throughout a predetermined part of said pressure range, said mechanism including means promptly to terminate said diminished action when a pressure above that corresponding to maximum cruising speed and power is reached and means for continuously varying said diminishing action to select similar patterns affording any desired ratio of the engine fuel and air within the compass of said mechanism, said selected ratio being maintained automatically throughout said predetermined part of the pressure range and up to the engine speed and power at which said diminished action is terminated, the maximum rich ratio being thereafter automatically maintained up to full speed and power.

20. In combination with an engine having an air supply conduit, a throttle therein and fuel supply means having an output proportional to the engine speed and whose output at any given speed is variable, a member movable to control the output of said fuel supply means, automatic fuel-air ratio control mechanism to actuate said control member to control automatically the fuel-air ratio at all operating positions of said throttle, said mechanism including hand operated setting means for changing the fuel-air ratio, and hand operated mechanism to operate said output control member to regulate the fuel-air ratio manually in the event of the failure of the automatic mechanism.

21. In combination with an engine having an air supply conduit, a throttle therein and fuel supply means having an output proportional to the engine speed and whose output at any given speed is variable, fuel-air ratio control mechanism acting on the fuel supply means and operating automatically in response to variations in pressure in said conduit between the throttle and the engine to produce a predetermined fuel-air ratio pattern, means to set said automatic mechanism to produce different fuel-air ratio patterns within the compass of said automatic mechanism, and hand operated selecting mechanism operable to actuate said setting means or, in the event of failure of the automatic mechanism, to act upon the fuel supply means to vary the fuel-air ratio manually.

22. In combination with an engine having an air supply conduit, a throttle therein, and fuel supply means having an output proportional to the engine speed and whose output at any given speed is variable, an output control member for the fuel supply means, fuel-air ratio control mechanism operating automatically in response to variations in pressure in said conduit between the throttle and the engine to actuate said output control member to produce a predetermined fuel-air ratio pattern, means to set said automatic mechanism to produce different fuel-air ratio patterns within the range of said automatic mechanism, and hand operated mechanism to operate said output control member to regulate the fuel-air ratio manually in the event of failure of the automatic mechanism.

23. In combination with an engine having an air supply conduit, a throttle therein and fuel supply means having an output proportional to the engine speed and whose output at any given speed is variable, automatic fuel-air ratio control mechanism to act on the fuel supply means to control automatically the fuel-air ratio at all operating positions of said throttle, a member movable to control the output of said fuel supply means, and mechanism interconnecting said output control member, said automatic control mechanism and said throttle including means to actuate said control member by said automatic mechanism to regulate the fuel-air ratio and means to actuate said control member by hand in event of failure of said automatic mechanism.

24. In combination with an engine having an air supply conduit, a throttle therein, operating mechanism therefor and fuel supply means having an output proportional to the engine speed and whose output at any given speed is variable, a member movable to control the output of said fuel supply means, automatic fuel-air ratio control mechanism to actuate said member to control automatically the fuel-air ratio at all operating positions of said throttle, and means operated by the throttle mechanism to act on said output control member to increase the fuel.

25. In combination with an engine having an air supply conduit, a throttle therein and a fuel supply device having an output proportional to the engine speed and whose output at any given speed is variable, automatic fuel-air ratio control mechanism to act on the fuel supply device to control automatically the fuel-air ratio at all operating positions of said throttle, and throttle operating means cooperating with said automatic control mechanism to act on said fuel supply device to increase but not to decrease the fuel.

26. In combination with an engine having an air supply conduit, a throttle therein and fuel supply means having an output proportional to the engine speed and whose output at any given speed is variable, a member movable to control the output of said fuel supply means, automatic fule-air ratio control mechanism to actuate said member to control automatically the fuel-air ratio at all operating positions of said throttle, and throttle operated means cooperating with said automatic control mechanism to act on said output control member to increase but not to decrease the fuel.

27. In combination with an engine having an air supply conduit, a throttle therein and fuel supply means having an output proportional to the engine speed and whose output at any given speed is variable, automatic fuel-air ratio control mechanism to act on the fuel supply means to control automatically the fuel-air ratio at all operating positions of said throttle, a member movable to control the output of said fuel supply means, and mechanism to actuate said output control member by either said automatic control mechanism or said throttle.

28. In combination with an engine having an air supply conduit, a throttle therein and fuel supply means having an output proportional to the engine speed and whose output at any given speed is variable, automatic fuel-air ratio control mechanism to act on the fuel supply means to control automatically the fuel-air ratio at all operating positions of said throttle, a member movable to control the output of said fuel supply means, and mechanism interconnecting said output control member, said automatic control mechanism and said throttle including means to actuate said control member by said automatic control mechanism to either increase or decrease the fuel and means to actuate the output control member by the throttle to increase the fuel to obtain a fuel-air ratio favorable to fast acceleration.

29. In combination with an engine having an air supply conduit, a throttle therein and fuel supply means having an output proportional to the engine speed and whose output at any given speed is variable, automatic fuel-air ratio control mechanism to act on the fuel supply means to control automatically the fuel-air ratio at all operating positions of said throttle, a member movable to control the output of said fuel supply means, and mechanism interconnecting said output control member, said automatic control mechanism and said throttle including means to cause said automatic mechanism to actuate said output control member to control the fuel-air ratio and means to cause any sudden opening movement of the throttle to actuate said output control member to increase the fuel until said automatic mechanism responds to the more open position of the throttle.

30. In combination with an engine having an air supply conduit, a throttle therein and fuel supply means having an output proportional to the engine speed and whose output at any given speed is variable, a member movable to control the output of said fuel supply means, and automatic ratio mechanism to control automatically the fuel-air ratio at all operating positions of said throttle comprising an output arm operatively connected with said output control member, means biasing said arm towards the "off" position, a throttle operated arm, a driving member actuated by said automatic mechanism adapted to engage said output arm to move it in a direction to increase the fuel output, a floating pivot lever interconnecting said throttle operated arm and said output arm and yielding means acting on said floating pivot tending to maintain said output arm in engagement with said driving member.

31. In combination with an engine having an air supply conduit, a throttle therein and fuel supply means having an output proportional to the engine speed and whose output at any given speed is variable, a member movable to control the output of said fuel supply means and automatic ratio mechanism to control automatically the fuel-air ratio at all operating positions of said throttle comprising an output arm operatively connected with said output control member, means biasing said arm towards the "off" position, a throttle operated arm, a driving member actuated by said automatic mechanism adapted to engage said output arm to move it in a direction to increase the fuel output, a floating pivot lever interconnecting said throttle operated arm and said output arm, yielding means acting on said floating pivot tending to maintain said output arm in engagement with said driving member and hand operated means to shift the position of said floating pivot.

32. In combination with an engine having an air supply conduit, a throttle therein and engine fuel supply means having an output proportional to the engine speed and whose output at any given speed is variable, a member movable to control the output of said fuel supply means, automatic ratio mechanism to control automatically the fuel-air ratio at all operating positions of said throttle, said automatic mechanism incorporating a servomotor and including stop means to cause said automatic mechanism to maintain said output control member at the proper position for operating the engine at idling speed, and hand operated mechanism for conditioning said servomotor for manual movement and actuating said output control member from the idling position to fuel cut-off position.

33. In combination with an engine having an air supply conduit, a throttle therein and engine fuel supply means having an output proportional to the engine speed and whose output at any given speed is variable, a member movable to control the output of said fuel supply means, automatic ratio mechanism to control automatically the fuel-air ratio at all operating positions of said throttle, said automatic mechanism incorporating a fluid pressure-operated servomotor and including stop means to cause said automatic mechanism to maintain said output control member at the proper position for operating the engine at idling speed, and hand-operated mechanism to cut off the pressure supply to the servomotor and equalize the pressure within the same and thereafter to actuate said output member from said idling position to the fuel cut-off position.

34. In combination with an engine having an air supply conduit, a throttle therein and engine fuel supply means having an output proportional to the engine speed and whose output at any given speed is variable, a member movable to control the output of said fuel supply means, automatic ratio mechanism to control automatically the fuel-air ratio at all operating positions of said throttle, said automatic mechanism incorporating a servomotor and setting means for changing the automatically controlled fuel-air ratio and including stop means to cause said automatic mechanism to maintain said output control member at the proper position for operating the engine at idling speed, and hand operated mechanism movable in one direction to actuate said ratio setting means and in the opposite direction to condition said servomotor for manual movement and to actuate said output control member from the idling position to fuel cut-off position.

35. In combination with an engine having an air supply conduit, a throttle therein and engine fuel supply means having an output proportional to the engine speed and whose output at any given speed is variable, a member movable to control the output of said fuel supply means, automatic ratio mechanism to control automatically the fuel-air ratio at all operating positions of said throttle, said automatic mechanism incorporating a fluid servomotor and setting means for changing the automatically controlled fuel-air ratio and including stop means to cause said automatic mechanism to maintain said output control member at the proper position for operating the engine at idling speed, and hand operated mechanism movable in one direction to actuate said ratio setting means and in the opposite direction to cut off the operating pressure from said servomotor and equalize the pressure within the same and thereafter to actuate said output member from said idling position to the fuel cut-off position.

36. In a fuel-air ratio control mechanism for an internal combustion engine having an air supply conduit, an air throttle therein, a supercharger, a manifold, fuel supply means having an output proportional to the engine speed and whose output any given speed is variable and an output control member therefor, fluid pressure responsive mechanism responsive to said manifold pressure, said mechanism including a main operating member having an operative connection with said output control member and a temperature responsive device responsive to said manifold temperature, said operative connection including means actuated by said temperature responsive device to amplify or diminish the action of said pressure responsive device on said output control member.

37. In a fuel-air ratio control mechanism for an internal combustion engine having an air supply conduit, an air throttle therein, a supercharger, a manifold and engine fuel supply means, a main actuating lever, a fluid pressure responsive device responsive to the manifold pressure connected to said lever to actuate the same, a bell crank lever pivoted on said main lever, a link operatively connecting said bell crank lever with said fuel supply means, a temperature responsive device responsive to the manifold temperature, and a member actuated thereby carrying a hinge center disposed between the fulcrum of the main lever and the pivot of said bell crank lever and movable in the same direction as said main lever and a link connecting said lever and said hinge center, said hinge center having a travel with change in the fluid temperature in the manifold between that corresponding to idling manifold pressure and that corresponding to full throttle manifold pressure substantially coextensive with the angular movement of said main lever between said pressures.

38. In a fuel-air ratio control mechanism for an internal combustion engine having an air supply conduit, an air throttle therein, a supercharger, a manifold and engine fuel supply means, a main actuating lever fulcrumed intermediate its ends, a fluid pressure responsive device responsive to the manifold pressure connected to one end of said lever to actuate the same, a bell crank lever pivoted on said main lever near its opposite end, a link operatively connecting said bell crank lever to the engine fuel supply means, a temperature responsive device responsive to the manifold temperature, an arm actuated thereby pivoted beyond the end of said main lever to which the pressure responsive device is connected, said arm having a hinge center disposed between the fulcrum of the main lever and the pivot of said bell crank lever and movable in the same direction as said main lever, and a link connecting said hinge center and said bell crank lever, said hinge center having a travel with change in the fluid temperature in the manifold between that corresponding to idling manifold pressure and that corresponding to full throttle manifold pressure substantially coextensive with the angular movement of said main lever between said pressures.

39. In a fuel-air ratio control mechanism for an internal combustion engine having an air supply conduit, an air throttle therein and engine fuel supply means, a main actuating lever, a fluid pressure responsive device responsive to the pressure in said conduit between the throttle and the engine connected to said lever to actuate the same, a bell crank lever pivoted on said main lever, a link operatively connecting said bell crank lever with said fuel supply means, a temperature responsive device responsive to the temperature in said conduit between the throttle and the engine, a member actuated thereby carrying a hinge center disposed between the fulcrum of the main lever and the pivot of said bell crank lever and movable in the same direction as said main lever, and a link connecting said lever and said hinge center.

40. In a fuel-air ratio control mechanism for an internal combustion engine having an air supply conduit, an air throttle therein and engine fuel supply means, a main actuating lever fulcrumed intermediate its ends, a fluid pressure responsive device responsive to the pressure in said conduit between the throttle and the engine connected to one end of said lever to actuate the same, a bell crank lever pivoted on said main lever near its opposite end, a link operatively connecting said bell crank lever to the engine fuel supply means, a temperature responsive device responsive to the temperature in said conduit between the throttle and the engine, an arm actuated thereby pivoted beyond the end of said main lever to which the pressure responsive device is connected, said arm carrying a hinge center disposed between the fulcrum of the main lever and the pivot of said bell crank lever and movable in the same direction as said main lever, and a link connecting said hinge center and said bell crank lever.

41. In combination with an engine having an air supply conduit, a throttle therein, throttle operating mechanism, and fuel supply means having an output proportional to the engine speed and whose output at any given speed is variable, a part movable to control the output of said fuel supply means, automatic fuel-air ratio control mechanism to control automatically the fuel-air ratio at all operating positions of said throttle, a member to actuate said output control part, a member actuated by said throttle operated mechanism, means for interconnecting said members comprising a lever having a movable pivot and manual means for adjusting the position of said pivot.

42. In combination with an engine having an air supply conduit, a throttle therein, throttle operating mechanism, and fuel supply means having an output proportional to the engine speed and whose output at any given speed is variable, a part movable to control the output of said fuel supply means, automatic fuel-air ratio control mechanism to control automatically the fuel-air ratio at all operating positions of said throttle, a member connected to actuate said output control part, a member actuated by said throttle operated mechanism, means for interconnecting said members comprising a lever having a movable pivot, a mounting for said pivot yieldable in one direction, and manual means for adjusting said mounting in either direction.

43. In combination with an engine having air supply means, a throttle therefor, fuel supply means having an output proportional to the engine speed and whose output at any given speed is variable, mixture control mechanism including automatic mechanism to act on the fuel supply means to control automatically the fuel-air ratio at all operating positions of said throttle according to a predetermined pattern, setting mechanism to vary said pattern, means to vary the fuel-air ratio independently of said automatic mechanism, and fuel cut-off mechanism, a manually operated adjusting member for said mixture control mechanism, mechanism operatively connecting said member with said setting means, said independent ratio control mechanism and said fuel cut-off mechanism, said adjusting member having a setting range of movement to adjust said setting mechanism and having two supplemental ranges of movement on either side of said setting range, one of said supplemental ranges effecting actuation of said independent fuel-air ratio control mechanism and the other supplemental ranges effecting operation of said fuel cut-off mechanism.

44. In combination with an engine having air supply means, a throttle therefor, fuel supply means having an output proportional to the engine speed and whose output at any given speed is variable, mixture control mechanism including automatic mechanism to act on the fuel supply means to control automatically the fuel-air ratio at all operating positions of said throttle according to a predetermined pattern, setting mechanism to vary said pattern, means to vary the fuel-air ratio independently of said automatic mechanism, and fuel cut-off mechanism, a manually operated adjusting member for said mixture control mechanism, mechanism operatively connecting said member with said setting means, said independent ratio control mechanism and said fuel cut-off mechanism, said adjusting member having a setting range of movement to adjust said setting mechanism and having two supplemental ranges of movement on either side of said range, one of said supplemental ranges effecting actuation of said independent fuel-air ratio control mechanism and the other supplemental range effecting operation of said fuel cut-off mechanism, latching mechanism for said manually operated adjusting member engageable to limit the movement of said member at the opposite ends of said setting range, and means for releasing said latching mechanism to permit movement of said member into each of said supplemental ranges.

45. The combination with an engine having air supply means, a throttle therefor and fuel supply means, of a fuel-air ratio mixture control device having a housing comprising two principal sections, a fixed section for mounting in fixed position on the engine including operating connections to said fuel means to control the output thereof and to manually operated adjusting members and including mechanism operatively interconnecting said manual adjusting members and said fuel output control means, and the second section of said housing including mixture control mechanism to act automatically on the fuel supply control means to control automatically the fuel-air ratio at all operating positions of said throttle.

46. In combination with an engine having an air supply conduit, a throttle therein and fuel supply means having an output proportional to the engine speed and whose output at any given speed is variable, a fluid pressure operated mechanism responsive to the pressure in said conduit between the throttle and the engine and acting on the fuel supply means to control the output thereof throughout the range of such pressure variation of the engine to vary the ratio of the engine fuel and air according to a predetermined pattern, and mechanism associated with said fluid pressure operated mechanism and said fuel supply means for changing the action of said mechanism on said means to alter proportionally the ratio of fuel and air at each point of a predetermined part of said pressure range but following said predetermined pattern.

47. In combination with an engine having an air supply conduit, a throttle therein and fuel supply means having an output proportional to the engine speed and whose output at any given speed is variable, a fluid pressure operated mechanism responsive to the pressure in said conduit between the throttle and the engine and acting on the fuel supply means to control the output thereof throughout the range of such pressure variation of the engine to vary the ratio of the engine fuel and air according to a predetermined pattern affording a maximum rich ratio, mechanism for diminishing the action of the pressure responsive mechanism on the fuel supply means according to a similar pattern affording a leaner ratio throughout a predetermined part of said pressure range, said mechanism comprising two bell crank levers pivoted on a common axis, one of said levers being connected for actuation by said fluid pressure operated mechanism, the other of said levers being connected to the fuel supply means to vary the output thereof, a pair of links having a common pivot at one end and having their opposite ends connected respectively to said bell crank levers, and means for moving said common pivot outwardly from the common axis of the bell crank levers during their operation so as to cause said levers to rotate with respect to each other and lessen the movement imparted to the fuel supply means to change its output.

DESIRE J. DESCHAMPS.

CERTIFICATE OF CORRECTION.

Patent No. 2,388,681.

November 13, 1945.

DESIRE J. DESCHAMPS.

It is hereby certified that error appears in the printed specification of the above numbered patent requiring correction as follows: Page 18, first column, line 62, claim 35, before "servomotor" insert --pressure-operated--; and second column, line 5, claim 36, after "output" insert --at--; and that the said Letters Patent should be read with this correction therein that the same may conform to the record of the case in the Patent Office.

Signed and sealed this 5th day of February, A. D. 1946.

Leslie Frazer (Seal)             First Assistant Commissioner of Patents.